US006971009B2

(12) United States Patent
Dutta

(10) Patent No.: US 6,971,009 B2
(45) Date of Patent: Nov. 29, 2005

(54) SYSTEM AND METHOD FOR PLACEMENT OF USER-NEGOTIATED SECURITY FEATURES ON TICKET ITEMS

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 09/817,867

(22) Filed: Mar. 26, 2001

(65) Prior Publication Data

US 2002/0138723 A1    Sep. 26, 2002

(51) Int. Cl.$^7$ .............................................. H04L 9/00
(52) U.S. Cl. ..................... 713/172; 713/201; 705/5
(58) Field of Search ................. 713/200–202, 713/172, 186, 155, 170; 380/51; 705/5

(56) References Cited

U.S. PATENT DOCUMENTS

| | | | |
|---|---|---|---|
| 5,598,477 A | 1/1997 | Berson | 380/51 |
| 6,216,227 B1 | 4/2001 | Goldstein et al. | 713/172 |
| 6,454,174 B1 | 9/2002 | Sansone | 235/494 |
| 6,527,173 B1 | 3/2003 | Narusawa et al. | 235/380 |
| 6,609,659 B2 | 8/2003 | Sehr | 235/384 |
| 6,779,720 B2 * | 8/2004 | Lewis | 235/382 |
| 6,813,039 B1 * | 11/2004 | Silverbrook et al. | 358/1.18 |

OTHER PUBLICATIONS

Bruce Schneier, Applied Cryptography 2$^{nd}$ Edition, 1996, pp. 34-35.
Chan, Siu-cheung Charles, "Electronic Smart Passport/Visa," Aug. 17, 1997, pp. 1-11.

* cited by examiner

*Primary Examiner*—Gregory Morse
*Assistant Examiner*—Tongoc Tran
(74) *Attorney, Agent, or Firm*—VanLeeuwen & VanLeeuwen; Joseph T. VanLeeuwen; Jeffrey S. LaBaw

(57) ABSTRACT

A customer prints a ticket that includes customer security features that appear on the printed ticket. The features, such as a digital photograph of the customer, are checked by the merchant when the ticket is presented. If the security features do not match a ticket holder's features, the merchant denies admission to the ticket holder. The background area of the printed ticket contains a pattern to make it difficult for someone to insert other security features onto the ticket. The printed ticket includes a barcode that can be scanned by the merchant for fast retrieval of the purchaser's security features previously provided by the customer to the merchant. The retrieved security features are compared to both the ticket holder's features and the security features that appear on the printed ticket. A discrepancy during any of these comparisons enables the merchant to identify the imposter and deny admission.

18 Claims, 15 Drawing Sheets

SYSTEM AND METHOD FOR PLACEMENT OF USER-NEGOTIATED SECURITY FEATURES ON TICKET ITEMS

RELATED APPLICATIONS

This application is related to the following co-pending U.S. Patent Applications filed on the same day as the present application and having the same inventor and assignee: "System and Method for Purchasing Ticket Items with User-Negotiated Security Features," Ser. No. 09/817,868); "System and Method for Processing Ticket Items with Customer Security Features," Ser. No. 09/817,866); "System and Method for Maintaining User Security Features," Ser. No. 09/817,891); and "System and Method for Binding and Unbinding Ticket Items with User-Negotiated Security Features," Ser. No. 09/817,844) each by Dutta and each assigned to the IBM Corporation.

BACKGROUND

1. Field of the Invention

The present invention relates to a system and method for providing customer security features. More particularly, the present invention relates to a system and method for placing user-negotiated security features, such as a photograph, on a printed ticket.

2. Description of the Related Art

Electronic tickets are gaining increased acceptance as more people use the Internet and become more familiar and comfortable with buying items, including tickets, from online vendors and merchants. Electronic tickets can then be printed by the customer on the customer's printer. Often, electronic tickets include a ticket identifier that can be scanned, such as a barcode, to ensure that a given ticket is only used once. After the barcode on the ticket is read, a subsequent reading of the same barcode triggers an error and alerts the merchant that a duplicate ticket has been tendered and the merchant can refuse the second ticket holder admission.

Electronic tickets are typically purchased by a customer using a personal computer with an Internet browser to access a ticket merchant's web site. The customer selects a ticket from the merchant's web site and typically pays for the ticket online by providing credit card information so that the merchant can charge the ticket purchase to the customer's credit card. The merchant processes the customer's request and, if the credit card charge is accepted, provides the customer with ticket information that can be printed on the customer's printer.

Electronic tickets can also be used to gather information about the customers that can be used by the merchant for more effective marketing. While electronic tickets provide merchants with increased information and a level of protection, a challenge exists in gaining consumer confidence in using the system.

Currently, a ticket that is printed out by a customer can be used by anyone that gains possession of the printed ticket. The actual customer is typically not referenced on the face of the ticket by name or any other means. A challenge exists in more tightly binding the actual customer with a given ticket.

Tickets are often sold (i.e., "scalped") or given away by the original ticket customer to other customers. Popular sporting events and music concerts often have many "scalpers" selling tickets outside the arena, often for prices well above the original ticket price. An unscrupulous scalper could photocopy a given electronic ticket and sell the same ticket to multiple buyers. Because the electronic ticket is typically printed on the customer's printer, on their face they are not as secure from being photocopied as traditional tickets that are printed using a special printing process and special ticket paper. The lack of special printing causes a lack of confidence in buying a ticket from a third party.

What is needed, therefore, is a system and method to bind a customer to a ticket using the customer's own security features. Furthermore, what is needed is a way of authenticating an electronic ticket using the customer's security features to ensure that the rightful customer is the ticket holder. Moreover, what is needed is a way to transfer an electronic ticket from one individual to another by unbinding the first individual's security features from the ticket and rebinding the ticket to the second individuals security features.

SUMMARY

It has been discovered that a customer can create a security profile that includes security features that correspond to the customer. Security features may include a digital photograph of the customer, an image of the customer's signature, a fingerprint, information about the customer's physical attributes, and a digital signature. The customer's security profile features can be printed on the ticket so that they can be visually checked by the merchant before redeeming a ticket held by an individual.

When a customer prints a ticket that includes customer security features, the features appear on the printed ticket. The features, such as a digital photograph of the customer, can be checked by the merchant when the customer redeems the ticket. If someone else, such as an imposter, tries to redeem the ticket the merchant determines that the security features do not match the ticket holder and deny admission to the ticket holder. The background area of the printed ticket may contain a pattern to make it difficult for someone to cut and paste other security features onto the ticket. The printed ticket may include a barcode that can be scanned by the merchant for fast retrieval of the purchaser's security features previously provided by the customer to the merchant. The retrieved security features can be compared to both the ticket holder's features and the security features that appear on the printed ticket. A discrepancy during any of these comparisons enables the merchant to identify the imposter and deny admission.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should riot be taken to be limiting of the invention itself. Rather, any number of variations may fall within the scope of the invention which is defined in the claims following the description.

Figure 1:
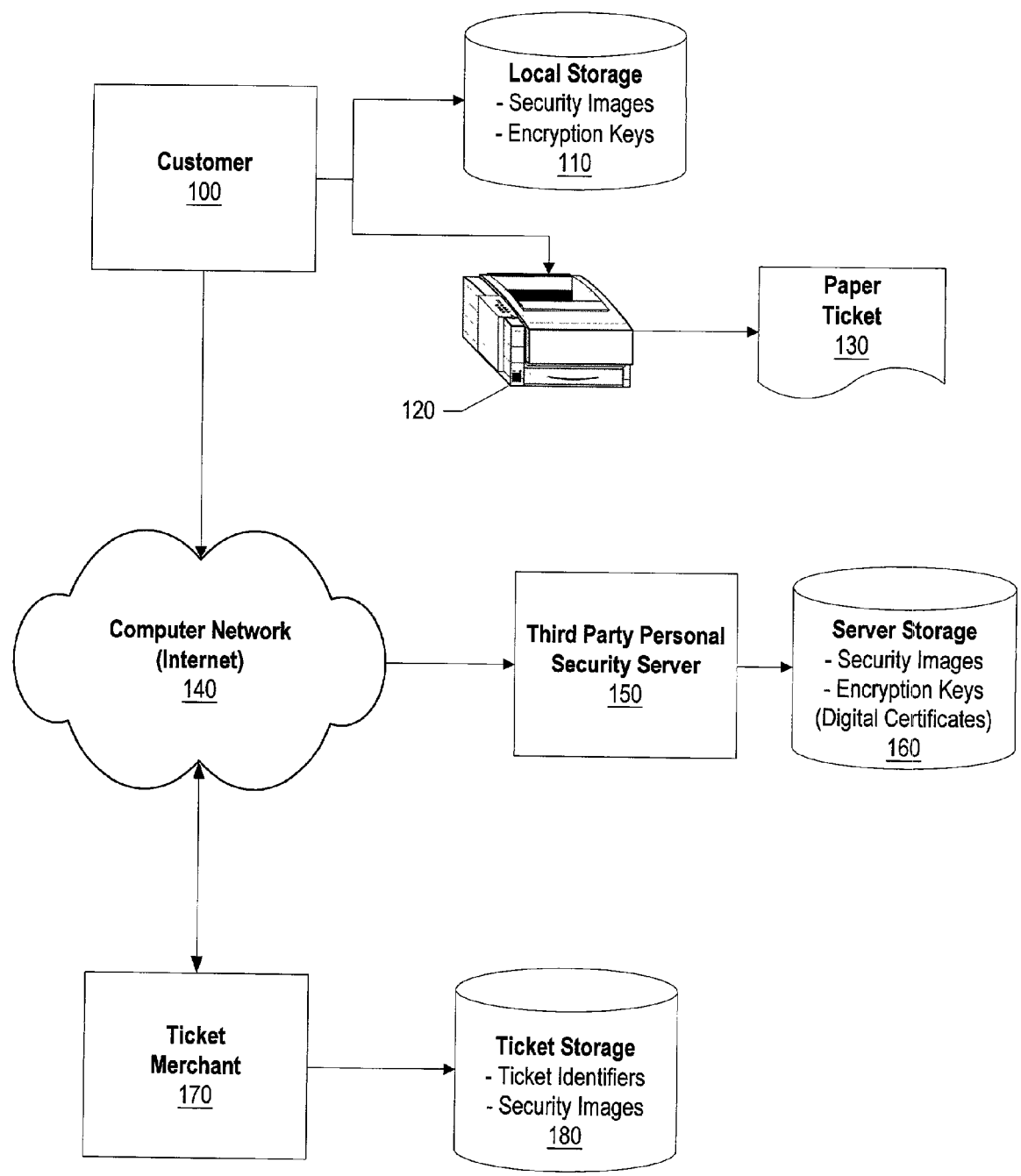
FIG. 1 is a network diagram showing a customer, a third party personal security server, and a merchant exchanging security information about the customer to prepare a ticket.

FIG. 1 is a network diagram showing a customer, a third party personal security server, and a merchant exchanging security information about the customer to prepare a ticket. Customer 100 uses a computer system to store security images and encryption keys on local storage 110. Local storage 110 is a nonvolatile storage device, such as a disk drive, magnetic media, nonvolatile memory, or the like. The computer system that customer uses may be a desktop system, a laptop system, a handheld computing device, or a pervasive computing device, such as an Internet appliance.

The security images that customer 100 stores on local storage 110 may be a digital photograph of the customer, a scanned image of the customer's signature, a digital signature, a thumbprint, or any other image or data that can be used to identify the customer. Printer 120 is used to print paper ticket items 130 that include security features (i.e., images) of the customer along with a ticket.

Customer 100 uses his computer system to communicate with other computer systems using computer network 140, such as the Internet. Customer 100 sends secure transmissions over computer network 140 to third party personal security server 150. Third party personal security server 150 is programmed to manage security profiles for multiple customers. These profiles are stored on server storage 160 along with encryption information to identify and/or verify customers and merchants that request actions from third party personal security server 150.

Customers' transactions with third party personal security server are protected using encrypted transmissions. Public key—private key encryption can be used, secure socket layers (SSL) can be used (using public key-private key encryption algorithms), or simple encryption using shared passwords can be used. In addition, a certification authority can be used to issue digital certificates to customers, merchants, and third party personal security servers to both identify the party and provide encryption keys. Encryption keys typically include a set of keys—a private key and a public key. The public key is given out to anyone and the private key, as the name implies, is kept secret by the key owner. When the owner of the key pair encrypts data using his private key, then a receiver can decipher the data using the public key. Because only the private key could have encrypted the data, the receiver is assured that the sender of the data was the key owner and not an imposter. When the receiver wants to send data to a key owner and ensure that others cannot intercept and read the data, then the receiver encrypts the data using the key owner's public key. Because only the key owner's private key can be used to decipher the data, the receiver is assured that the data will remain private. Digital certificates are public/private key pairs that are issued by a certification authority after verifying the identity of the user. The certification authority can then be used to verify a user's identity when another user obtains the user's public key, thus exposing potential imposters.

Customer 100 communicates with ticket merchant 170 using computer network 140 to purchase tickets. The tickets can be simple theater tickets, airline tickets, or any other type of ticket that a customer may purchase or obtain. Communications between customer 100 and ticket merchant 170 are preferably encrypted to prevent others from intercepting transmitted data. Customer 100 and merchant 170 determine what personal security features (i.e., images) will be included with customer's ticket 130. Ticket merchant 170 may receive these security features from customer 100 or from third party personal security server 150. Ticket merchant 170 also receives payment information, such as a credit card number, from customer 100 to purchase the desired tickets. Tickets that are issued by ticket merchant 170 to customer 100 are assigned a ticket identifier. The ticket identifier and security features corresponding to the ticket identifier are stored by merchant 170 on merchant's ticket storage 180. To prevent the dissemination of the customer's security features, the actual security images may not be stored on ticket storage 180. Instead, a link is provided to the feature stored at either customer's local storage 110 or third party personal security server's server storage 160. A security feature viewer may be installed at the ticket merchant that allows the merchant to view the security images, perhaps for a certain amount of time until the ticket expires, but does not allow the merchant to copy the security images onto a storage device. The security feature viewer may use encryption to allow the viewing, and not copying, of customers' security features.

Figure 2A:
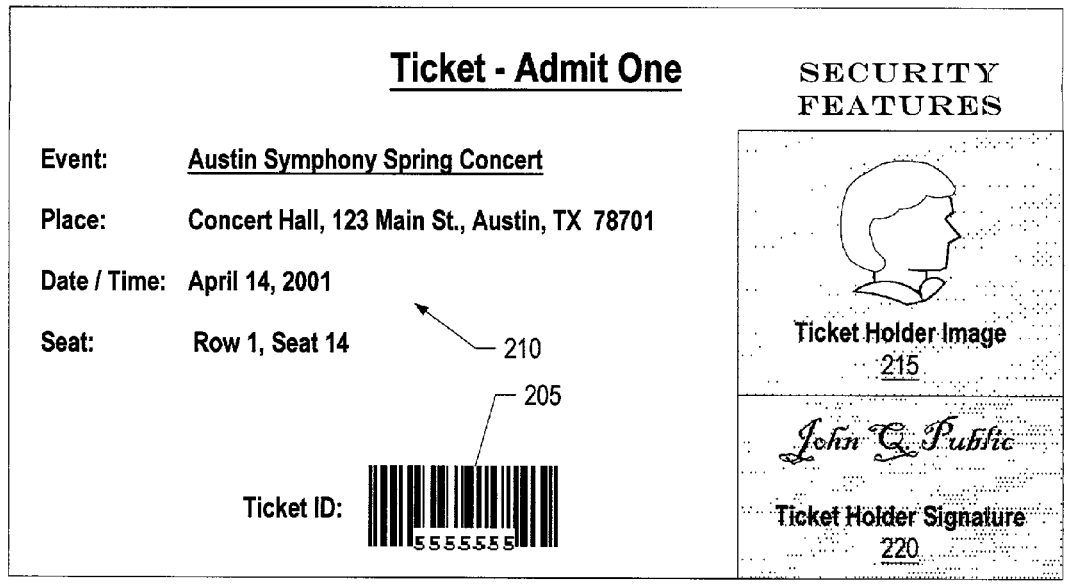
FIG. 2a is an example ticket that includes security features identifying the customer.

FIG. 2a is an example ticket that includes security features identifying the customer. Ticket 200 can be printed on the customer's printer or displayed on a display screen. Ticket 200 includes a ticket identifier 205 that uniquely identifies the ticket to the merchant or the party that will receive the ticket. Ticket identifier 205 may, as shown in FIG. 2*a*, be printed in a barcode format to allow the ticket identifier to be easily scanned. Ticket 200 also includes information area 210 that includes information about the ticketed event, such as the name of the event, the place the event is held, the date and time of the event, and the customer's seat or location. Ticket 200 also includes security features that identify the customer. In the example shown, security features include digital photograph 215 and signature 220. A printing background can be included to make it more difficult for someone to steal the printed ticket and insert the thief's own photograph and signature on the ticket. In addition, the merchant's computer system used to process the tickets may provide the stored security features on a display device. If the stored security features do not match the security features that appear on the ticket, further fraud detection and identification processes can be performed to determine whether the ticket holder is in possession of a stolen ticket.

Figure 2B:
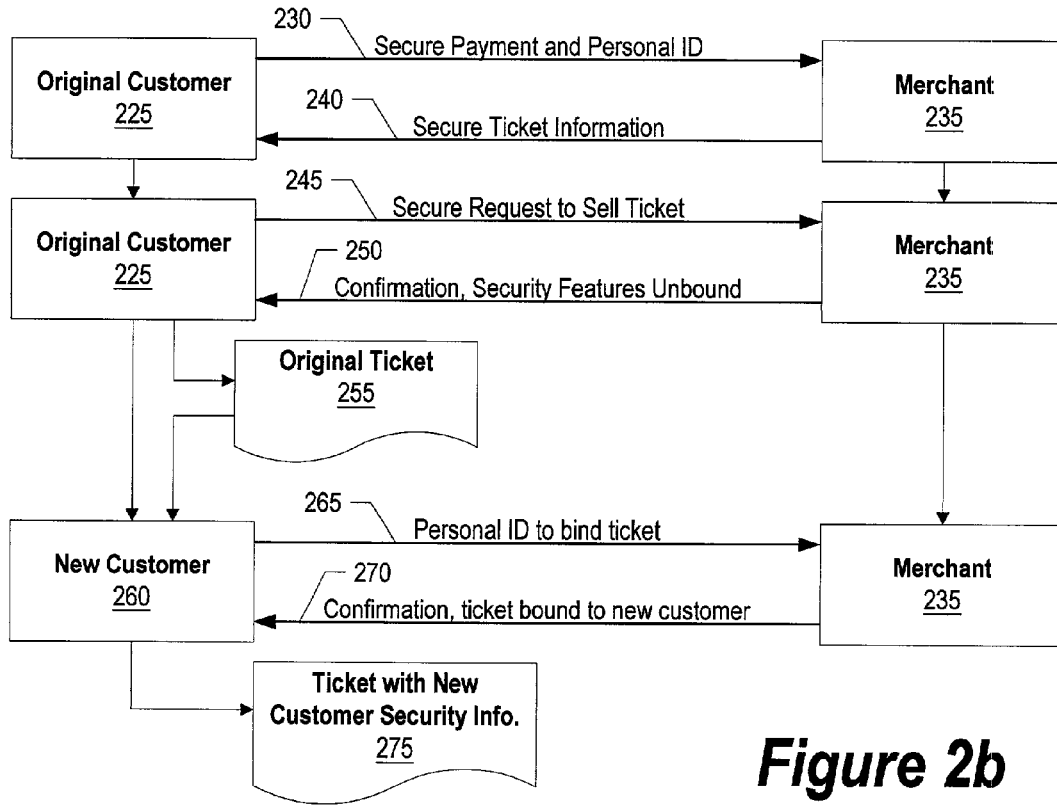
FIG. 2b is a data flow for unbinding the secured ticket from an original customer and rebinding it to a second customer.

FIG. 2*b* is a data flow for unbinding the secured ticket from an original customer and rebinding it to a second customer. Original customer 225 sends payment information and personal security information to merchant 235 (dataflow 230) to purchase a ticket. Merchant 235 responds by sending original customer 225 secure ticket information (dataflow 240). Dataflow 240 also includes the ticket identifier corresponding to the ticket.

If the original customer is unable or no longer wishes to use the ticket, he may wish to sell or give original ticket 255 to new customer 260. However, during the original transaction, security features corresponding to original customer 225 were bound to the ticket. To unbind the security features from the ticket identifier, original customer 225 sends a request to merchant 235 (dataflow 245) requesting to unbind the original customer's security features from the ticket. Merchant 235 responds by unbinding the security features from the ticket and sends confirmation (dataflow 250) to original customer 225. Once the ticket is unbound from the security features, original customer 225 can transfer original ticket 255 to new customer 260. New customer can then communicate with merchant 235 to bind the ticket to security features corresponding to the new customer (dataflow 265). Merchant 235 responds by binding the new customer's security features to the ticket and sending confirmation (dataflow 270) to new customer 260. New customer 260 can then print ticket 275 that now includes the new customer's security features.

The dataflows shown in FIG. 2*b* can be compressed to provide all of the outgoing dataflows in a single packet and all of the incoming dataflows in a separate packet. For example, if the original customer sold the ticket to the new customer over the Internet, then the new customer's payment to the original customer could be contingent on the new customer being able to bind his security features to the ticket to ensure that the original customer is not selling the same ticket to multiple people. In this transaction, the new customer readies a payment to the original customer and receives an encrypted packet that includes instructions for the merchant to unbind the original customer's security features from the ticket. The new customer sends the request to the merchant and receives the unbound notice, thus ensuring that the ticket has only been sold by the original customer to the new customer. If the original customer had tried to sell the same ticket to multiple buyers, then the new customer would receive an error either when sending the original customer's unbind request or when he sent his own bind request to the merchant.

Figure 3:
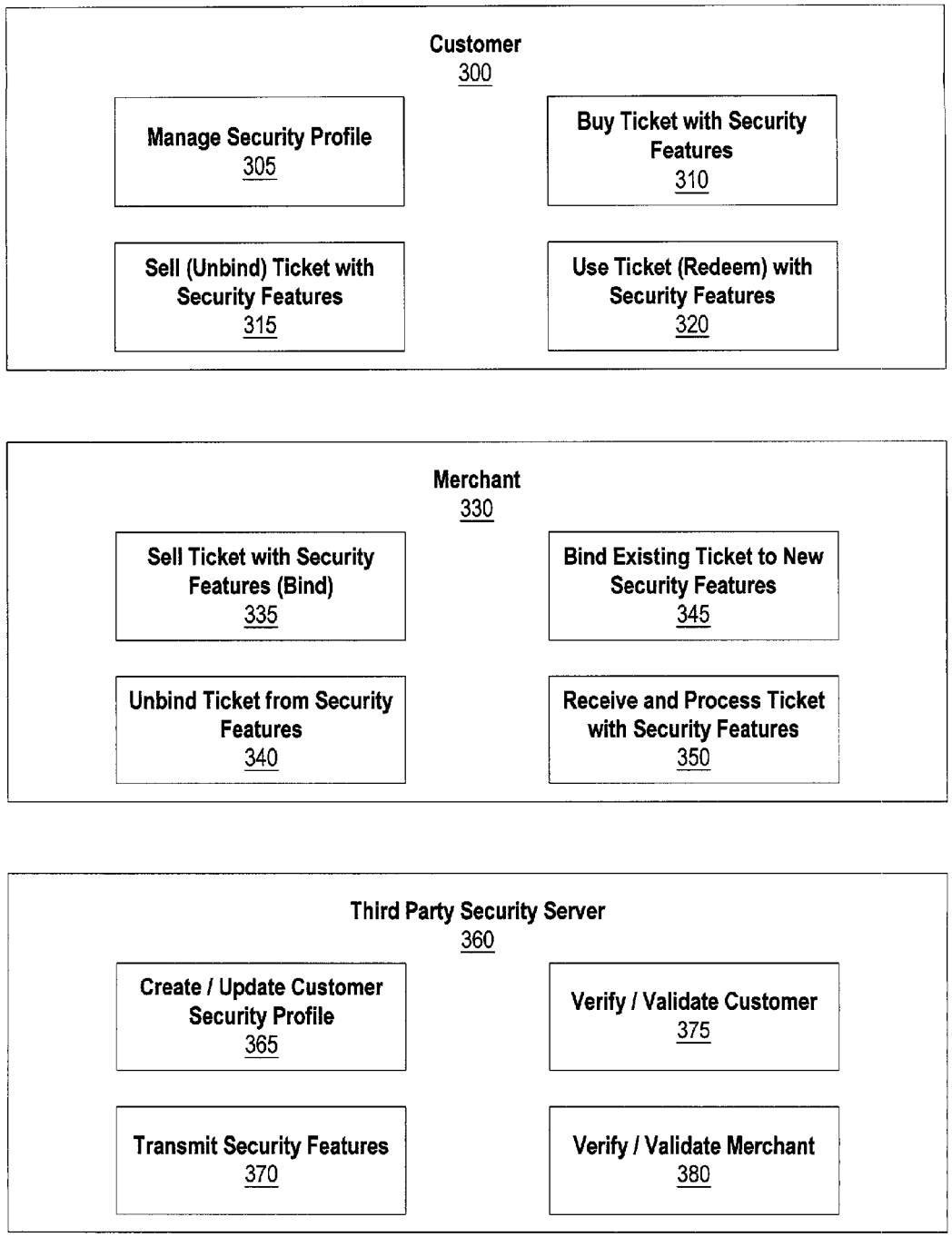
FIG. 3 is a function chart showing high level functions performed by customers, merchants, and third party security servers.

FIG. 3 is a function chart showing high level functions performed by customers, merchants, and third party security servers. Customer functions 300 include managing the customer's security profile (function 305), that includes creating and editing the customer's security features as well as managing encryption keys and certificates used to identify the customer. Customer functions 300 also includes processing to buy a ticket that includes the customer's security features (function 310). A sub-function within function 310 allows the customer to bind his security features with a ticket identifier that has already been issued by a merchant. Customer functions 300 also includes processing to unbind his security features from a ticket that he purchased from a merchant (function 315). Customer functions 300 also includes the process of the customer using the ticket with the customer's security features to gain admission to an event, activity, or otherwise use the ticket (function 320).

Merchant functions 330 include negotiating security features with a customer and selling the customer a ticket bound to the customer's security features (function 335). Merchant functions 330 also includes unbinding a customer's security features from a ticket that was previously purchased by the customer (function 340). Merchant functions 330 also include binding existing ticket identifiers that are currently unbound to new security features provided by a customer (function 345). Merchant functions 330 also include receiving tickets that are bound to a customer's security features and processing the ticket (function 350). Processing the ticket may simply involve visually inspecting the security features included on the printed ticket, and may also involve retrieving the customer's security features using a computer display device to determine that the ticket was not altered or tampered.

Third party security server functions 360 include creating and updating customer's security profiles that include one or more security features (function 365). Third party security server functions 360 also include transmitting customers' security features upon receiving an authorized request (function 370). Third party security server functions 360 also include verifying and validating customers' identifies to restrict updates and creation of customer profiles to the appropriate customer (function 375). Third party security server functions 360 also include verifying and validating a merchant's identity and authorization to retrieve security features corresponding to a particular customer (function 380).

Figure 4:
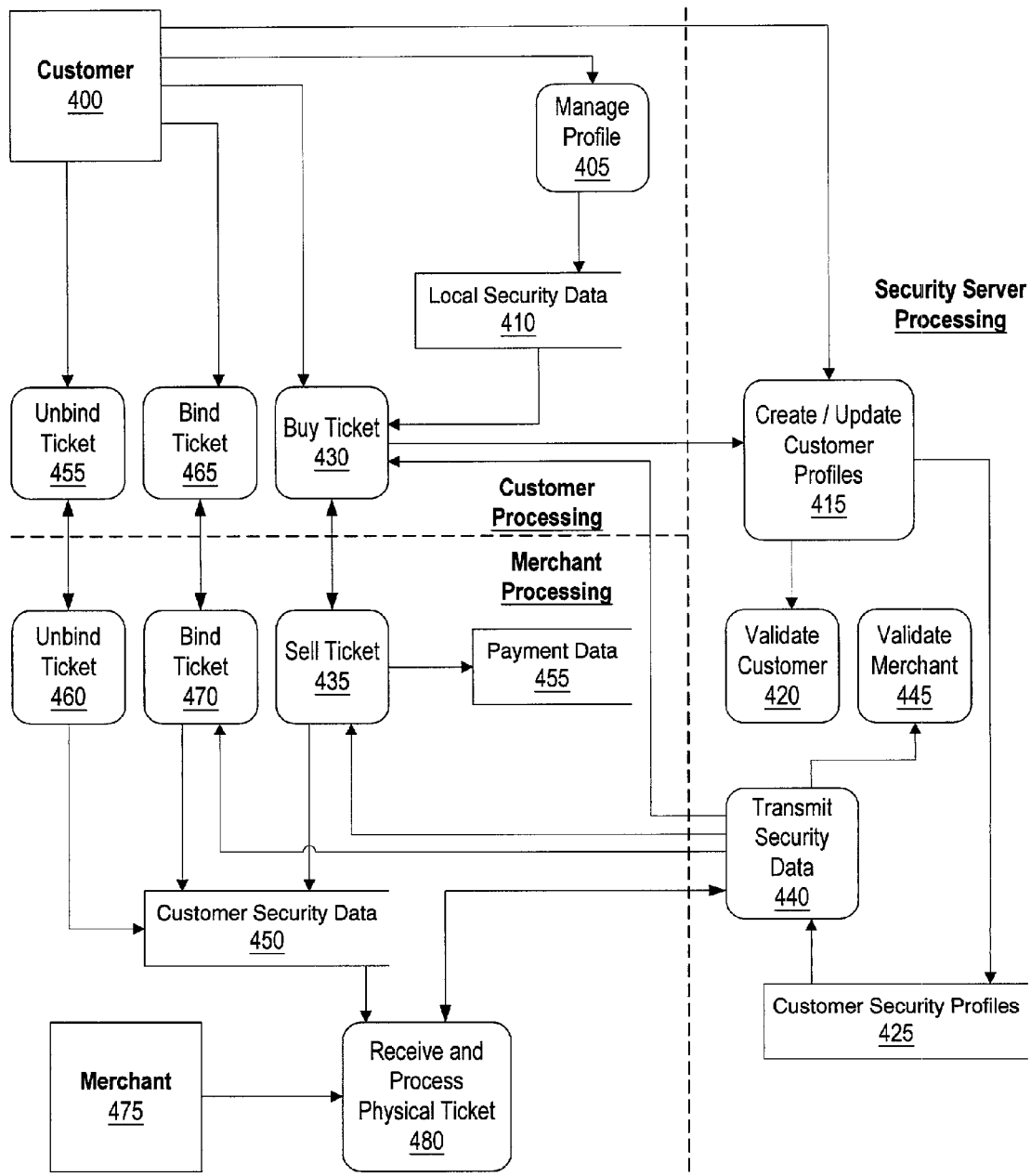
FIG. 4 is a data flow diagram for data flowing between customers, merchants, and third party security servers.

FIG. 4 is a data flow diagram for data flowing between customers, merchants, and third party security servers. Customer 400 uses manage profile process 405 to create and edit secure features that are stored on local security data store 410. In addition customer 400 sends and receives data from create/update customer profiles process 415 executed within a third party security server. Process 415 stores customer security features and data on customer security profiles data store 425 accessible to the third party security server.

When customer 400 wishes to purchase a ticket he uses buy ticket process 430. Buy ticket process 430 may be a network (i.e., Internet) application that runs within browser software installed on the customer's computer system or may be a stand alone software application. Process 430 negotiates security features with sell ticket process 435 installed on the merchant's server computer and accessible through a computer network, such as the Internet. Buy ticket process 430 may retrieve customer security features from local security data store 410 stored on the customer's computer system or from customer security profiles 425 stored on a third party security server (through transmit security data process 440). Buy ticket process 430 also sends payment data, such as credit card information to sell ticket process 435. Sell ticket process 435 stores the customer's negotiated security features in customer security data store 450. In one embodiment, the actual security features are stored in data store 450 for later retrieval when the customer redeems the ticket. In another embodiment, links that enable the merchant to view the customer's security features on a viewer are stored in the merchant's customer security data store 450 with the actual data residing on the security server's customer security profiles data store 425. Buy ticket process 430 sends authorization information to the security server's create/update customer profiles process 415 to add the merchant as an authorized user to receive selected security features corresponding to the customer. This authorization information is used by the security server when the merchant attempts to retrieve customer security features. In addition, timestamps can be used so that the merchant is only allowed to retrieve such security features during a specified time period, such as the date of the performance corresponding to the ticket. Restricting which users have access to customer security features and when authorized users may access the information aids in preventing the customer's security features from being transmitted to other users who may have a malicious intent of stealing identities belonging to customers.

Payment data, such as credit card information, is sent from buy ticket process 430 to sell ticket process 435 and stored in payment data store 455. Sell ticket process 435 sends ticket information, including a ticket identifier, back to the customer's buy ticket process 430. The ticket information is used by the customer to print a paper copy of the ticket or to transfer the ticket to someone else.

If the customer wants to sell or transfer the purchased ticket to someone else, he unbinds his security features from the purchased ticket so that the new ticket holder will be able to redeem the ticket. Customer 400 uses unbind ticket process 455 to communicate with the merchant's unbind ticket process 460. Unbind process 155 sends the ticket identifier along with information, such as the customer's digital signature, to verify that the customer (and not an imposter) is sending the unbind request. Unbind process 460 receives the unbind request along with the ticket identifier and customer digital signature. Unbind process 460 authenticates the customer and then unbinds the security features corresponding with the ticket identifier by updating the merchant's customer security data store 450.

If the new ticket holder wishes to bind the ticket to the new ticket holder, that customer uses bind ticket process 465 to send bind ticket request to the merchant's bind ticket process 470. Because payment has already been received for the ticket, the merchant does not receive further payment data, unless of course a processing fee is required to process the new ticket holder's bind ticket request. The new ticket holder negotiates which security features he wants on the ticket and sends this information to the merchant's bind ticket process 470. The security features corresponding to the new ticket holder (or links to such security features as described above) are stored in the merchant's customer security data store 450 and bound to the ticket identifier.

Merchant 475 eventually receives tickets from ticket holders and processes the tickets to determine whether to admit the ticket holder using process 480. Customer security data matching the ticket identifier is retrieved from customer security data store 450. If the customer's actual security features are stored in data store 450, then those features are used to compare with the features found on the physical ticket to determine whether the customer is the same person as the ticket holder. In addition, the security features that appear on the ticket, such as the customer's photograph, are used to compare with the ticket holder's features to determine whether the ticket holder matches the security features. If the security features are stored on a security server, process 480 requests such features from transmit security data process 480. Process 440 receives a merchant identifier, such as the merchant's digital signature and validates the merchant using process 445. In addition, validate merchant process 445 may read the customer's security profile to determine whether the customer has authorized this merchant to receive the requested security features. If the merchant is validated and authorized, selected security features are returned to the merchant's process 480.

Figure 5:
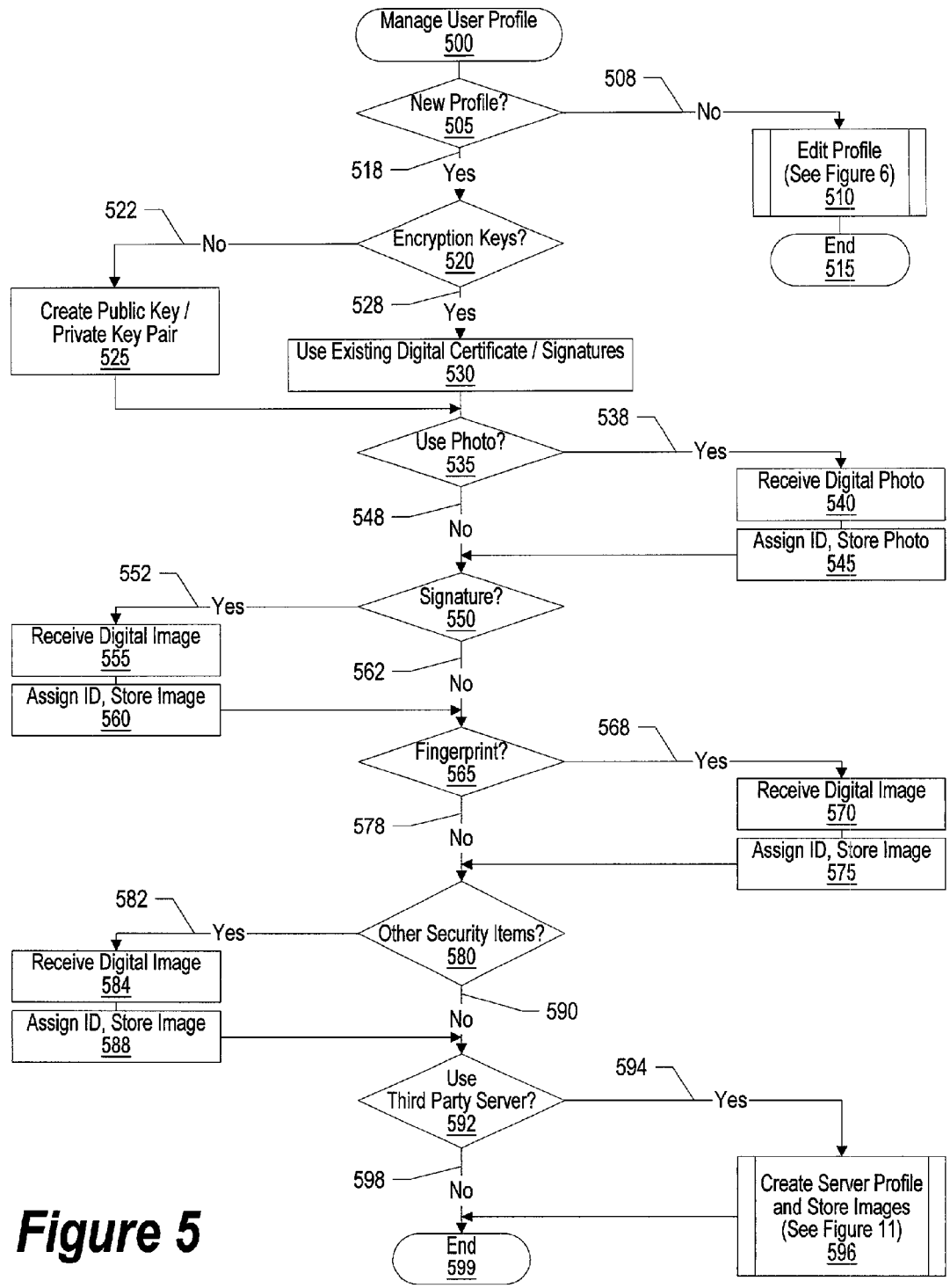
FIG. 5 is a flowchart of a customer creating his security profile including various security features.

FIG. 5 is a flowchart of a customer creating his security profile including various security features. Processing commences at 500 whereupon a determination is made as to whether the user (customer) is creating a new profile (decision 505). If the user is not creating a new profile, decision 505 branches to "no" branch 508 whereupon an edit profile process is invoked (predefined process 510, see FIG. 6 for further details) and processing ends at 515.

On the other hand, if a new profile is being created, decision 505 branches to "yes" branch 518. Another determination is made as to whether the user has a set of encryption keys to use (decision 520). If the user does not have a set of encryption keys, decision 520 branches to "no" branch 522 whereupon a set of encryption keys is created (step 525). Encryption keys can also be provided from a certification authority (CA). The certification authority is a third party that will confirm the user's identity and issue a digital certificate. If the user already has a set of encryption keys to use, decision 520 branches to "yes" branch 528 whereupon the existing keys, perhaps an existing digital certificate, is used (step 530).

A series of decisions is made to determine which security features the user wants to include in his security profile. A determination is made whether the user wants a photograph of the user to be included (decision 535). If the user wants to include a digital photograph, decision 535 branches to "yes" branch 538 whereupon a digital photograph is received from the user (step 540) and an identifier is assigned to the received photograph and stored along with the photograph in the user's security profile (step 545). If the user does not wish to include a digital photograph, decision 535 branches to "no" branch 548 bypassing the photograph inclusion steps.

A determination is made whether the user wants a signature of the user to be included (decision 550). If the user wants to include a signature, decision 550 branches to "yes" branch 552 whereupon a signature is received (i.e. using a scanner or a digital signature) from the user (step 555) and an identifier is assigned to the received signature and stored along with the signature in the user's security profile (step 560). If the user does not wish to include a signature, decision 550 branches to "no" branch 562 bypassing the signature inclusion steps.

A determination is made whether the user wants a fingerprint of the user to be included (decision 565). If the user wants to include a fingerprint, decision 565 branches to "yes" branch 568 whereupon a digital fingerprint is received (i.e. using a scanner) from the user (step 570) and an identifier is assigned to the received fingerprint and stored along with the fingerprint in the user's security profile (step 575). If the user does not wish to include a fingerprint, decision 565 branches to "no" branch 578 bypassing the photograph inclusion steps.

A determination is made whether the user wants other possible security features corresponding to the user to be included (decision 580). Other possible security features may include written characteristics about the user as often found on driver's licenses, or other digital images. If the user wants to include other security features, decision 580 branches to "yes" branch 582 whereupon the other security features are received from the user (step 584) and an identifier is assigned to each of the other received security features and stored along with the other security features in the user's security profile (step 588). If the user does not wish to include other security features, decision 580 branches to "no" branch 590 bypassing the signature inclusion steps.

A determination is made as to whether a third party security server will be used to help manage and maintain the user's security features (decision 592). If a security server is used, decision 592 branches to "yes" branch 594 whereupon a customer security profile is created on the security server and the user's security features are stored on the security server (predefined process 596, see FIG. 11 for processing details) and processing ends at 599. On the other hand, if a third party security server is not used, decision 592 branches to "no" branch 598 and processing ends at 599.

Figure 6:
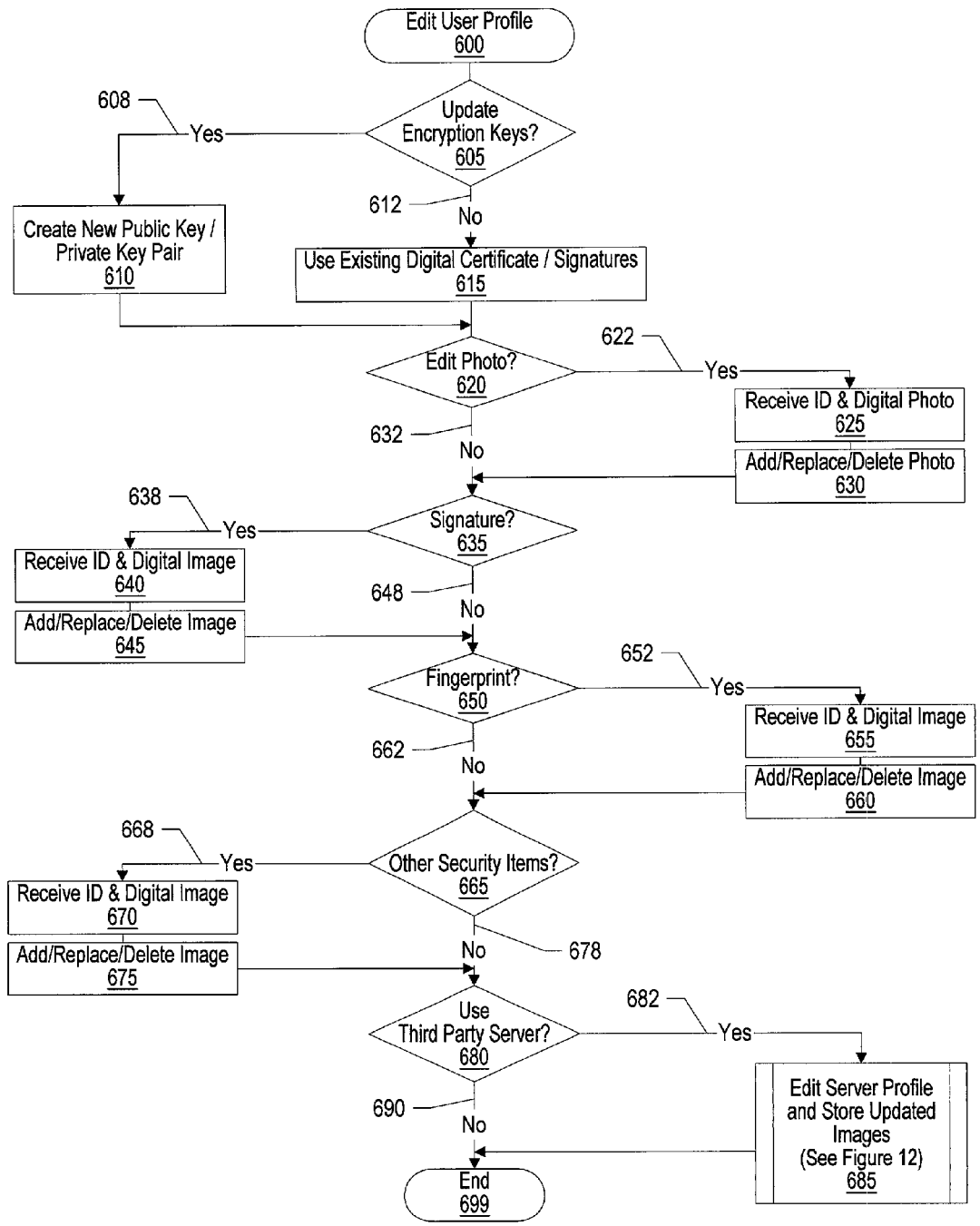
FIG. 6 is a flowchart of a customer editing an existing security profile.

FIG. 6 is a flowchart of a customer editing an existing security profile. Processing commences at 600 whereupon a determination is made as to whether the user's encryption keys will be updated (decision 605). If the keys are being updated, decision 605 branches to "yes" branch 608 and a new set of encryption keys is created or a new set of keys is received from a certification authority (step 610). If the keys are not being updated, decision 605 branches to "no" branch 612 whereupon the existing digital certificate or encryption keys are used (step 615).

A series of decisions is made to determine which security features the user wants to edit or include in his security profile. A determination is made whether the user wants to edit or add a photograph of the user to the profile (decision 620). If the user wants to edit or add a digital photograph, decision 620 branches to "yes" branch 622 whereupon a digital photograph and a current identifier are received from the user (step 625) and the identifier is stored along with the photograph in the user's security profile (step 630). If the received photograph is blank or the user otherwise indicates that the existing photograph is deleted then the existing photograph is deleted in step 630. If the user does not wish to edit or include a digital photograph, decision 620 branches to "no" branch 632 bypassing the photograph editing steps.

A determination is made whether the user wants to edit or include a signature of the user in the profile (decision 635). If the user wants to edit or include a signature, decision 635 branches to "yes" branch 638 whereupon an identifier and an updated or new signature is received from the user (step 640) and the identifier is assigned to the received signature and stored along with the signature in the user's security profile (step 645). If the received signature is blank or the user otherwise indicates that the existing signature is deleted then the existing signature is deleted in step 645. If the user does not wish to include a signature, decision 635 branches to "no" branch 648 bypassing the signature editing steps.

A determination is made whether the user wants to edit or include a fingerprint of the user in the security profile (decision 650). If the user wants to edit or include a fingerprint, decision 650 branches to "yes" branch 652 whereupon an identifier and a digital fingerprint is received from the user (step 655) and the identifier is assigned to the received fingerprint and stored along with the fingerprint in the user's security profile (step 660). If the received fingerprint is blank or the user otherwise indicates that the existing fingerprint should be deleted then the existing fingerprint is deleted in step 660. If the user does not wish to edit or include a fingerprint, decision 650 branches to "no" branch 662 bypassing the fingerprint editing steps.

A determination is made whether the user wants other possible security features corresponding to the user to be edited or included (decision 665). If the user wants to edit or include other security features, decision 665 branches to "yes" branch 668 whereupon replacement security features and their identifiers are received from the user (step 670) and an identifier is assigned to each of the received security features and stored along with the security features in the user's security profile (step 675). If the received security feature is blank or the user otherwise indicates that the existing security feature should be deleted then the existing security feature is deleted in step 675. If the user does not wish to include other security features, decision 665 branches to "no" branch 678 bypassing the security feature editing steps.

A determination is made as to whether a third party security server is used to manage and maintain the user's security features (decision 680). If a security server is used, decision 680 branches to "yes" branch 682 whereupon the user's security profile is updated on the security server using the user's updated security features (predefined process 685, see FIG. 12 for processing details) and processing ends at 699. On the other hand, if a third party security server is not used, decision 680 branches to "no" branch 690 and processing ends at 699.

Figure 7:
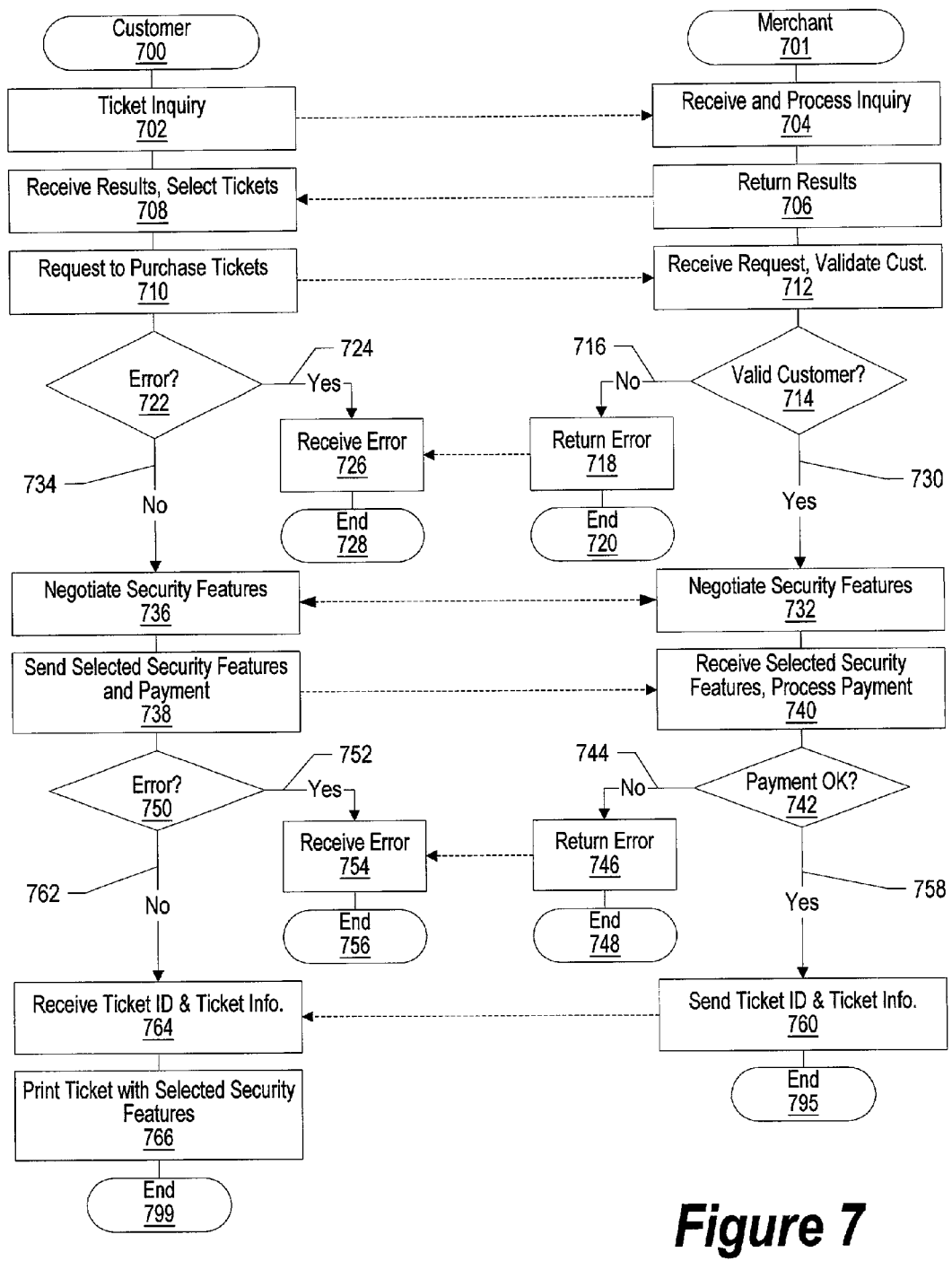
FIG. 7 is a flowchart of customer and merchant processing in preparing a ticket that includes customer security features.

FIG. 7 is a flowchart of customer and merchant processing in preparing a ticket that includes customer security features. Customer processing begins at 700 and merchant processing begins at 701. Customer processing sends a ticket inquiry to the merchant computer system regarding an event or other ticket item (step 702). Merchant processing receives the request from the customer and processes the request (step 704). The customer request may be a request made over the Internet to a server providing merchant goods and services. Merchant processing returns the results from the inquiry to the customer's computer system (step 706). Customer processing receives the results from the merchant and the customer selects tickets that he wishes to purchased based on availability (step 708). The customer sends a request to the merchant to purchase the selected tickets (step 710). The merchant receives the customer's purchase request and validates the customer (step 712). The validation of the customer can be through a pre-established profile, a credit card, or a digital signature (digital certificate) used to identify the customer. The merchant determines whether the customer is a valid customer based on the information provided (decision 714). If the customer is not a valid customer, decision 714 branches to "no" branch 716 and returns an error to the customer's computer (step 718) indicating that the customer's identity was not validated and merchant processing ends at 720. Customer processing determines if an error with the request has occurred (decision 722). If an error occurs, decision 722 branches to "yes" branch 724 whereupon the error is received and displayed to the customer (step 726) and customer processing ends at 728.

If the customer is valid, merchant decision 714 branches to "yes" branch 730 and customer processing branches to "no" branch 734 whereupon processing continues. Security features that the customer wishes to include in the ticket are negotiated between the customer and the merchant (customer step 736 and merchant step 732). Merchant indicates which security features it is capable of using (step 732) and customer indicates which security features he has in his security profile and would like to use (step 734). The customer sends the selected (negotiated) security features to the merchant along with payment information, such as a credit card number (step 738). The merchant computer receives the selected security features from the customer and processes the payment (step 740). In some embodiments, the merchant may receive links to the customer's security features that are stored on a security server to avoid dissemination of the customer's actual security features.

The merchant computer uses the payment information to determine whether the payment is accepted (decision 742). If the payment is not accepted, decision 742 branches to "no" branch 744 whereupon an error message is returned to the customer indicating that the payment was not accepted (step 746) and merchant processing ends at 748. Customer processing determines whether an error occurred during payment processing (decision 750). If an error occurred, decision 750 branches to "yes" branch 752 whereupon the error is received and displayed to the user (step 754) and customer processing ends at 756.

If the payment is accepted, merchant decision 742 branches to "yes" branch 758 and customer decision 750 branches to "no" branch 762 and processing continues. Merchant computer system sends a ticket identifier corresponding to the purchased ticket and other ticket information (step 760). Ticket information may include a ticket layout template that describes the layout that should be used in printing the ticket by the customer so that the tickets received by the merchant are consistent in appearance and, thus, easier to process. Merchant processing then ends at 795. Customer processing receives the ticket identifier and ticket information from the merchant (step 764). The customer can then print the ticket with the selected security features (step 766, see FIG. 2a for a sample printed ticket). Customer processing then ends at 799.

Figure 8:
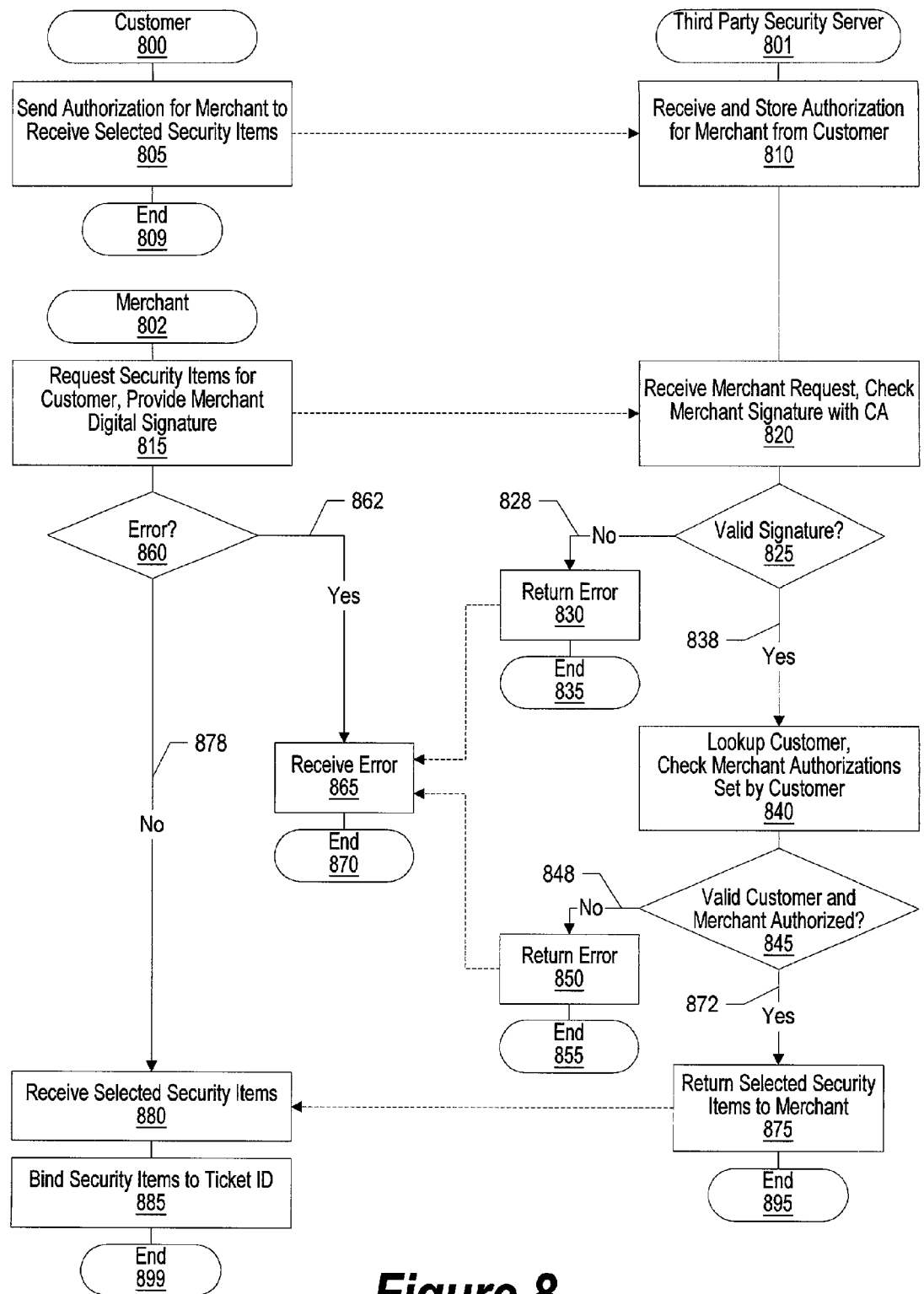
FIG. 8 is a flowchart of customer, merchant and third party security server processing allowing a merchant to access and retrieve security images corresponding to the customer at the security server.

FIG. 8 is a flowchart of customer, merchant and third party security server processing allowing a merchant to access and retrieve security images corresponding to the customer at the security server. Customer processing begins at 800 whereupon the customer's computer system sends an authorization for a merchant to receive selected security items to a third party security server (step 805). Step 805 may be performed in conjunction to receiving a ticket identifier and ticket information from a merchant (see step 764 on FIG. 7). The authorization in step 805 may also include a authorized time limit that is used to determine when a merchant can access the customer's security features. For example, the merchant may be restricted from receiving customer security features after the date of the ticketed event. Customer processing ends at 809.

Third party security server processing commences at 801 whereupon the server receives and stores the authorization sent by the customer authorizing a merchant to retrieve selected customer security features (step 810).

Merchant processing commences at 802 whereupon it requests selected security features corresponding to the customer from the third party security server (step 815). The merchant also digitally signs the transmission using the merchant's private key corresponding to the merchant's digital certificate. Third party security server receives the merchant request and verifies the merchant's digital signature by deciphering the message using the merchant's public key (step 820). Because only the merchant's private key corresponds to the public key, a successful deciphering indicates that the merchant encrypted the transmission with the merchant's private key. In addition, the merchant's public key is verified with a certification authority (CA) that previously authenticated the merchant. A determination is made as to whether the merchant's digital signature is valid (decision 825). If the signature is not valid, decision 825 branches to "no" branch 828 whereupon an error is returned to the merchant and third party security server processing ends at 835. On the other hand, if the signature is validated, decision 825 branches to "yes" branch 838 whereupon the customer's profile is located and a check is made as to whether the customer authorized the merchant to receive the selected security features (step 840). A determination is made as to whether the customer is valid and whether the merchant is authorized to retrieve the selected security features (decision 845). If either the customer is not valid or the merchant is not authorized, decision 845 branches to "no" branch 848 whereupon an error is returned to the merchant (step 850) and third party security server processing ends at 855. On the other hand, if the customer is valid and the merchant is authorized to retrieve the selected security features, decision 845 branches to "yes" branch 872 and the selected security features are sent to the merchant (step 875). Third party security server processing ends at 895.

Merchant processing determines whether an error occurred (decision 860) with the merchant's request for a customer's security features. If an error occurred, decision 860 branches to "yes" branch 862 whereupon the error is received by the merchant (step 865) and merchant processing ends at 870. On the other hand, if no errors occurred, decision 860 branches to "no" branch 878 whereupon the selected security features are received from the third party security server (step 880). If the merchant is receiving the security features as part of the customer's purchase of the tickets, then the received security features are bound to the ticket identifier corresponding to the ticket (step 885). If the merchant is receiving the security features as part of the customer redeeming the ticket, then the received security features are displayed for visual verification by the merchant. Merchant processing then ends at 899.

Figure 9:
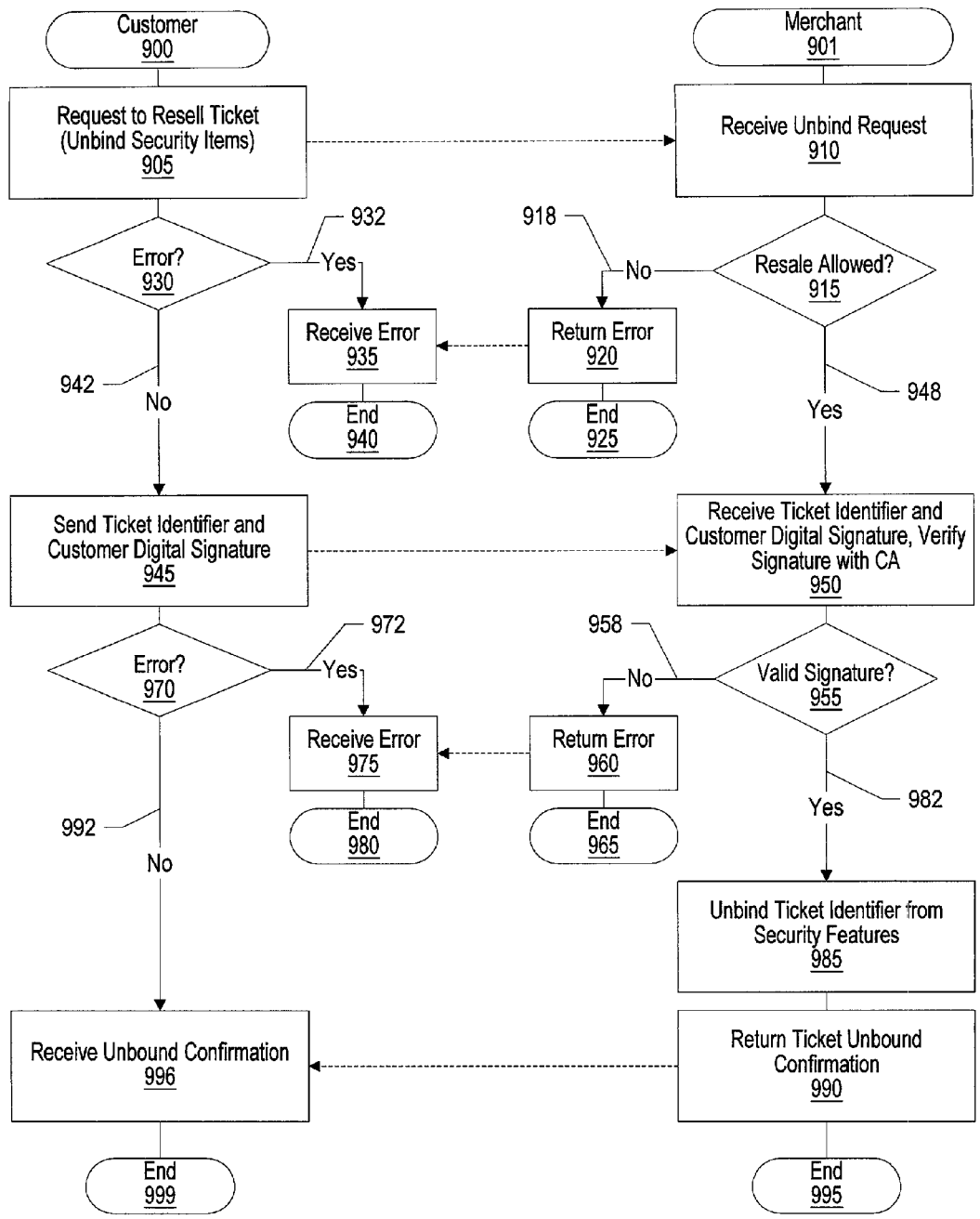
FIG. 9 is a flowchart of customer and merchant processing involved in unbinding a ticket from security features.

FIG. 9 is a flowchart of customer and merchant processing involved in unbinding a ticket from security features. Customer processing commences at 900 and merchant processing commences at 901. Customer sends a request to sell or transfer a previously purchased ticket to someone else (step 905) thereby unbinding the customer's security features from the identifier corresponding to the ticket. The merchant receives the customer's unbind request (step 910). The merchant determines whether a resale or transfer of the ticket is allowed (decision 915). If resale or transfer of the ticket is not allowed, decision 915 branches to "no" branch 918 whereupon an error is returned to the customer (step 920) and merchant processing ends at 925. Customer processing determines whether an error has occurred with the customer's request (decision 930). If an error has occurred, decision 930 branches to "yes" branch 932 whereupon the error is received from the merchant (step 935) and displayed to the customer before customer processing ends at 940.

On the other hand, if resale or transfer of the ticket is allowed, customer's decision 930 branches to "no" branch 942 and merchant's decision 915 branches to "yes" branch 948 whereupon processing of the unbind request continues. The customer sends a ticket identifier corresponding to the ticket and the customer's digital signature to the merchant (step 945). The ticket identifier and digital signature may have alternatively been sent along with the customer's initial request in step 905. The merchant receives the ticket identifier and the customer's digital signature and verifies the customer's identity using a certification authority (CA) (step 950).

A determination is made by the merchant as to whether the customer's digital signature is valid (decision 955). If the customer's digital signature is not valid, decision 955 branches to "no" branch 958 whereupon an error is returned to the customer (step 960) and merchant processing ends at 960. Customer processing determines whether an error occurred with the request (decision 970). If an error occurred, decision 970 branches to "yes" branch 972 whereupon the error is received (step 975) and customer processing ends at 980.

If the customer's digital signature is valid, merchant decision 955 branches to "yes" branch 982 and customer decision 970 branches to "no" branch 992 and processing continues. The merchant uses the received ticket identifier to unbind the ticket from the customer's security features (step 985). The unbound ticket confirmation is returned to the customer (step 990) and merchant processing ends at 995. Customer processing receives the unbound confirmation (step 996) and customer processing ends at 999.

Figure 10:
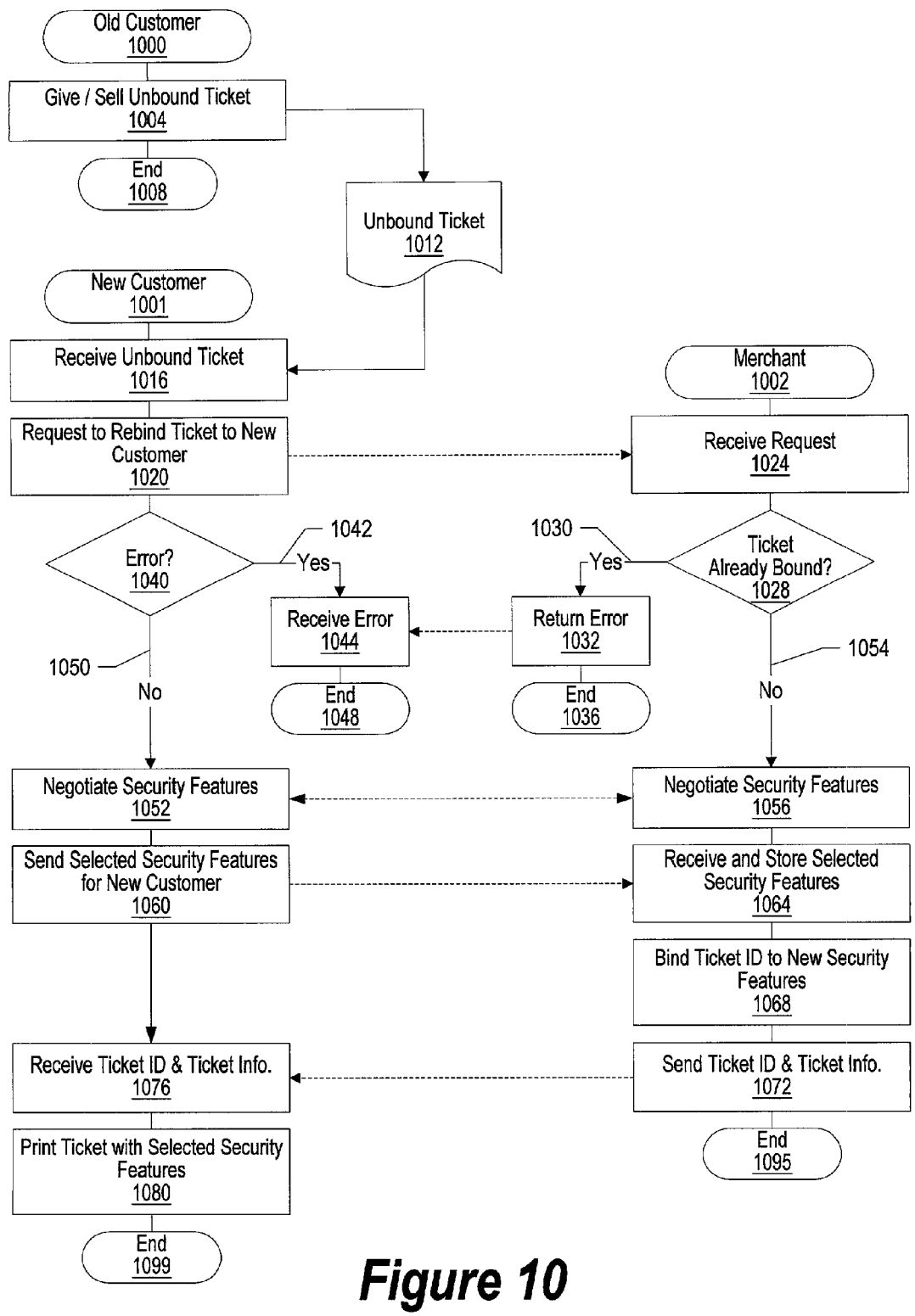
FIG. 10 is a flowchart of a customer transferring an unbound ticket to a new customer and the new customer binding his security features to the ticket.

FIG. 10 is a flowchart of a customer transferring an unbound ticket to a new customer and the new customer binding his security features to the ticket. Old customer processing commences at 1000 whereupon the old customer gives, sells or otherwise transfers unbound ticket 1012 to the new customer (step 1004). Old customer processing ends at 1008.

New customer processing commences at 1001 whereupon the new customer receives unbound ticket 1012 from the old customer (step 1016). The new customer uses the ticket identifier on unbound ticket 1012 to request that the merchant rebind the ticket to the new customer (step 1020). Merchant processing begins at 1002 whereupon the merchant receives the bind request from the new customer (step 1024). The merchant determines whether the ticket identifier supplied by the new customer is already bound to security features for another customer (decision 1028). If the ticket is already bound to another customer, decision 1028 branches to "yes" branch 1030 whereupon an error is returned to the new customer indicating that the ticket is already bound to another customer (step 1032) and merchant processing ends at 1036. New customer processing determines whether an error occurred with the new customer's bind request (decision 1040). If an error occurred, decision 1040 branches to "yes" branch 1042 whereupon the error is received (step 1044) and new customer processing ends at 1048.

If the ticket is not bound to another customer, new customer's decision 1040 branches to "no" branch 1050 and merchant's decision 1028 branches to "no" branch 1054 and processing continues. Security features that the customer wishes to include in the ticket are negotiated between the new customer and the merchant (new customer step 1052 and merchant step 1056). The merchant indicates which security features it is capable of using (step 1056) and customer indicates which security features he has in his security profile and would like to use (step 1052). The new customer sends the selected (negotiated) security features to the merchant (step 1060). The merchant computer receives the selected security features from the new customer (step 1064). In some embodiments, the merchant may receive links to the customer's security features that are stored on a security server to avoid dissemination of the customer's actual security features.

Merchant binds the ticket identifier to the security features provided by the new customer (step 1068). Merchant computer system sends a ticket identifier corresponding to the purchased ticket and other ticket information (step 1072). Ticket information may include a ticket layout template that describes the layout that should be used in printing the ticket by the new customer so that the tickets received by the merchant are consistent in appearance and, thus, easier to process. Merchant processing then ends at 1095. New customer processing receives the ticket identifier and ticket information from the merchant (step 1076). The new customer can then print the ticket with the selected security features (step 1080, see FIG. 2a for a sample printed ticket). New customer processing then ends at 1099.

Figure 11:
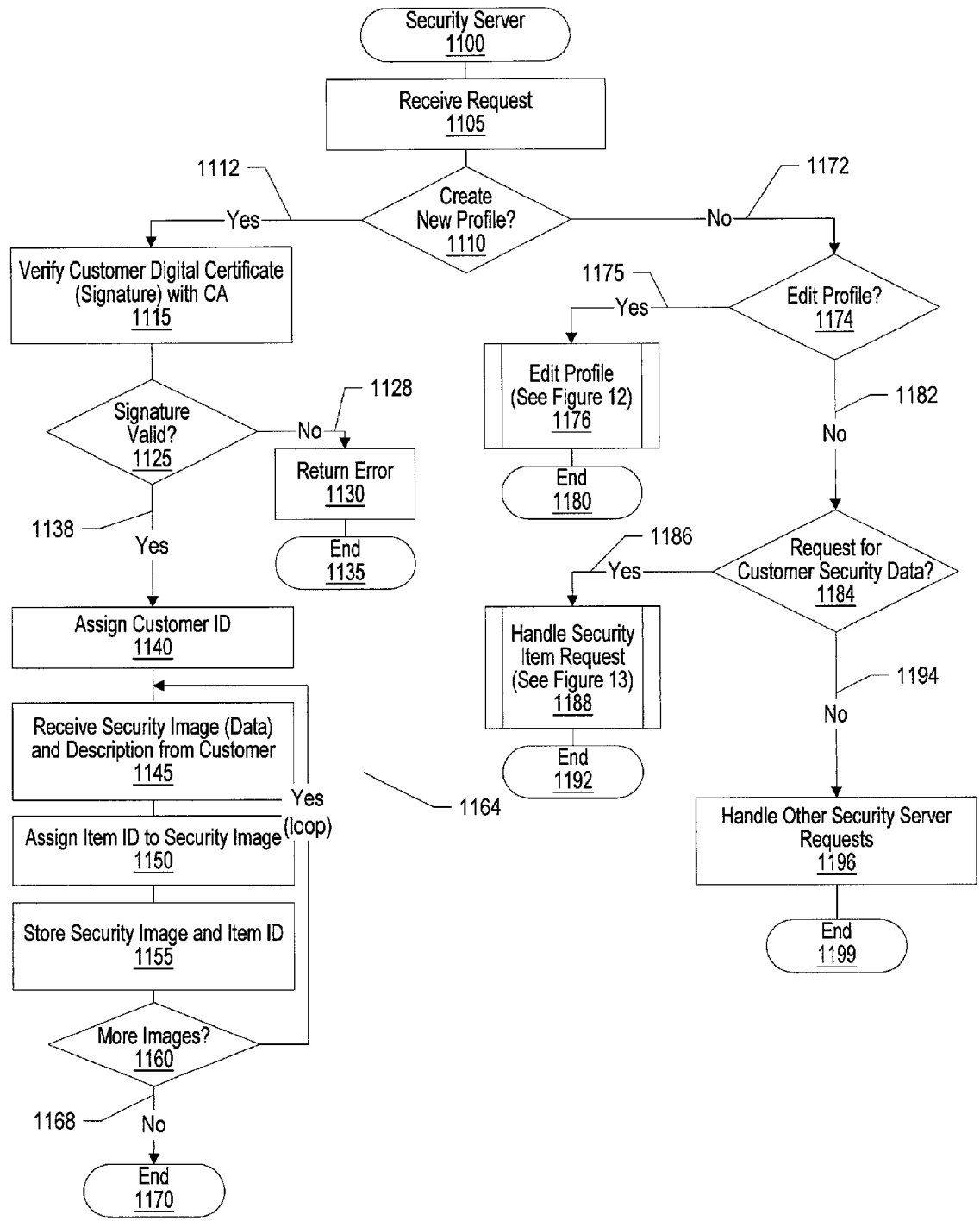
FIG. 11 is a flowchart of a third-party security server handling incoming requests including details of steps involved in creating a new customer profile.

FIG. 11 is a flowchart of a third-party security server handling incoming requests including details of steps involved in creating a new customer profile. Security server processing commences at 1100 whereupon a request is received (i.e., over a computer network) from another computer (step 1105). A determination is made as to whether the request is to create a new security profile for a customer (decision 1110). If the request is not to create a new security profile, decision 1110 branches to "no" branch 1172 for further determination regarding the received request. A determination is made as to whether the received request is to edit an existing security profile (decision 1174). If the request is to edit an existing customer's security profile, decision 1174 branches to "yes" branch 1175 whereupon the customer's profile is edited (predefined process 1176, see FIG. 12 for further processing details) and security server processing ends at 1180. On the other hand, if the request is not to edit a customer's security profile, decision 1174 branches to "no" branch 1182 and further determinations are made.

A determination is made as to whether the received request is to receive security features corresponding to a is customer (decision 1184). If the request is to receive customer security features, decision 1184 branches to "yes" branch 1186 whereupon the security item request is handled (predefined process 1188, see FIG. 13 for further processing details) and security server processing ends at 1192. On the other hand, if the request is not to retrieve customer security features, decision 1184 branches to "no" branch 1194 and the other security server requests are handled (step 1196). Security server processing ends at 1199.

Returning back to decision 1110, if the request was to create a new security profile for a user, decision 1110 branches to "yes" branch 1112 to handle the request. The customer's digital signature is verified, preferably with a certification authority, to determine the customer's identity (step 1115). A determination is made as to whether the customer's digital signature (certificate) is valid (decision 1125). If the signature is not valid, decision 1125 branches to "no" branch 1128 whereupon an error is returned to the customer (step 1130) and security server processing ends at 1135.

On the other hand, if the customer's digital signature is valid, decision 1125 branches to "yes" branch 1138 whereupon a customer identifier is assigned to the customer to open the customer's security profile (step 1140). A security feature, such as a digital photograph or scanned signature, is received from the customer along with a description of the received security feature (step 1145). An item identifier is assigned to the received security feature (step 1150) and the security feature is stored along with the assigned item identifier (step 1155). A determination is made as to whether the customer wishes to store additional security features on the security server (decision 1160). If the customer wants to store additional security features, decision 1160 branches to "yes" branch 1164 which loops back to process the next security feature. This looping continues until the customer does not wish to store additional security features, whereupon decision 1160 branches to "no" branch 1168 and processing ends at 1170.

Figure 12:
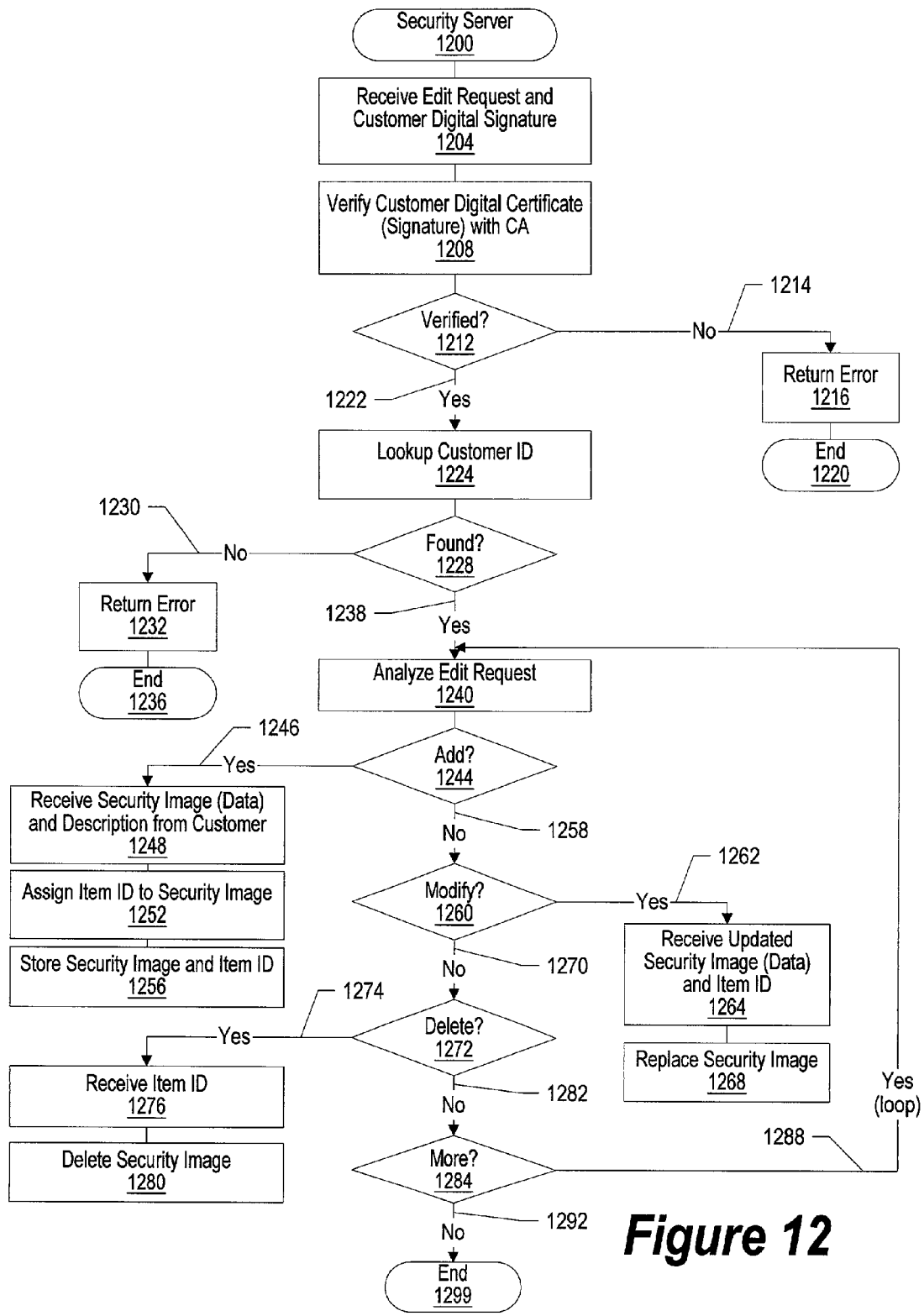
FIG. 12 is a flowchart of a third-party security server receiving and responding to an edit request of a customer's security features.

FIG. 12 is a flowchart of a third-party security server receiving and responding to an edit request of a customer's security features. Processing commences at 1200 whereupon the security server receives an edit request from a customer along with the customer's digital signature that uniquely identifies the customer (step 1204). The security server verifies the customer's identity using the digital signature and, preferably, checks the digital signature with a certification authority that is able to match the public key used to decipher the digital signature with a customer (step 1208).

A determination is made as to whether the digital signature that was provided is verified as belonging to the customer (decision 1212). If the signature is not verified, decision 1212 branches to "no" branch 1214 whereupon an error is returned to the customer (step 1216) and security server processing ends at 1220. On the other hand, if the signature is verified, decision 1212 branches to "yes" branch 1222 whereupon further processing of the customer's edit request continues. The customer identifier provided by the customer is checked against the current list of customers (step 1224). A determination is made as to whether the customer has an existing profile at the security server (decision 1228). If the customer does not have an existing security profile, decision 1228 branches to "no" branch 1230 whereupon an error is returned to the customer (step 1232) and security server processing ends at 1236.

On the other hand, if the customer's security profile is found, decision 1228 branches to "yes" branch 1238 whereupon the edit request is analyzed (step 1240). A series of determinations is made regarding received edit requests. A determination is made as to whether the customer is requesting to add a security feature to his profile (decision 1244). If the customer requests adding a security feature to his security profile, decision 1244 branches to "yes" branch 1246 whereupon the image or data corresponding to the new security feature is received from the customer along with a description of the security feature (step 1248). An item identifier is assigned to the new security feature (step 1252) and the new security feature is stored along with the assigned item identifier (step 1256).

If the customer's request is not to add a new security feature, decision 1244 branches to "no" branch 1258 and further determinations are made. A determination is made as to whether the customer is requesting to modify an existing security feature (decision 1260), for example by sending an updated photograph to replace an existing photograph. If the customer is requesting to modify an existing security feature, decision 1260 branches to "yes" branch 1262 whereupon the updated security image is received along with the identifier corresponding to the item (step 1264) and the currently stored security feature is replaced with the security feature provided by the customer (step 1268).

If the customer's request is not to modify an existing security feature, decision 1260 branches to "no" branch 1270 and further determinations are made. A determination is made as to whether the customer is requesting to delete an existing security feature (decision 1272). If the customer is requesting to delete an existing security feature, decision 1272 branches to "yes" branch 1274 whereupon the identifier corresponding to the security feature to be deleted is received from the customer (step 1276) and the corresponding security feature and item identifier are removed from the security server (step 1280).

A determination is made as to whether the customer has more edit requests (decision 1284). If the customer has more edit requests, decision 1284 branches to "yes" branch 1288 which loops back to process the next request. This looping continues until the customer has no more requests, at which point decision 1284 branches to "no" branch 1292 and processing ends at 1299.

Figure 13:
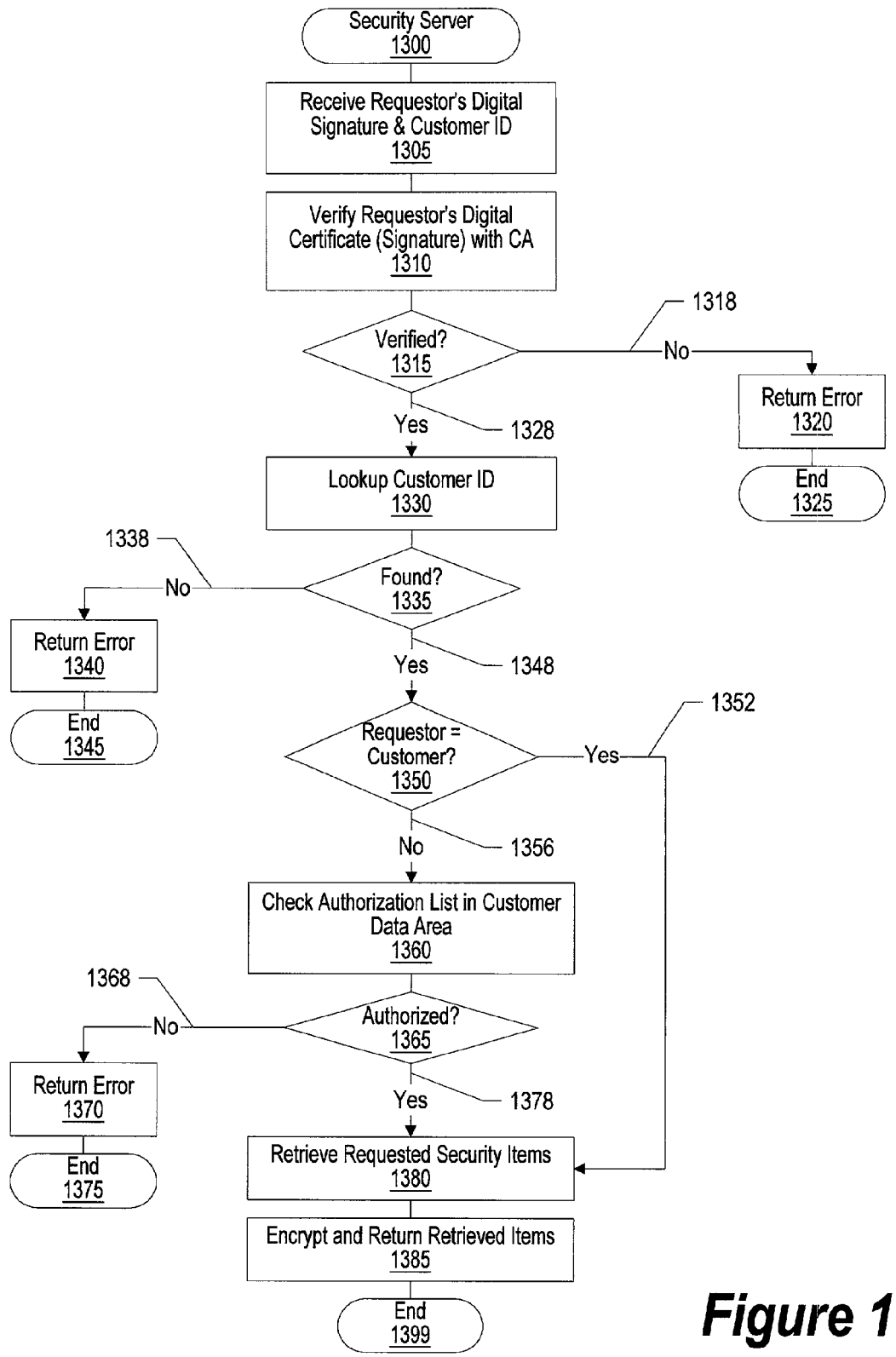
FIG. 13 is a flowchart of a third-party security server receiving and handling requests for customer security features.

FIG. 13 is a flowchart of a third-party security server receiving and handling requests for customer security features. Processing commences at 1300 whereupon the security server receives the requestor's digital signature and a customer identifier (step 1305). The security server verifies the requestor's identity using the digital signature and, preferably, checks the digital signature with a certification authority that is able to match the public key used to decipher the digital signature with a requestor (step 1310).

A determination is made as to whether the digital signature that was provided is verified as belonging to the requestor (decision 1315). If the signature is not verified, decision 1315 branches to "no" branch 1318 whereupon an error is returned to the requestor (step 1320) and security server processing ends at 1325. On the other hand, if the signature is verified, decision 1315 branches to "yes" branch 1328 whereupon further processing of the requestor's request continues.

The customer identifier provided by the requester is checked against the current list of customers (step 1330). A determination is made as to whether the customer has an existing profile at the security server (decision 1335). If the customer does not have an existing security profile, decision 1335 branches to "no" branch 1338 whereupon an error is returned to the requestor (step 1340) and security server processing ends at 1345.

On the other hand, if the customer's security profile is found, decision 1335 branches to "yes" branch 1348 whereupon a determination is made as to whether the requestor is the customer (decision 1350). If the requestor is the customer, decision 1350 branches to "yes" branch 1352 bypassing further authorization checks. On the other hand, if the requestor is not the customer, for example the requester may be a merchant, then decision 1350 branches to "no" branch 1356.

An authorization list corresponding to the customer is checked to determine whether the requester is authorized to retrieve security features belonging to the customer (step 1360). A determination is made as to whether the requester is authorized to retrieve the requested information (decision 1365). If the requester is not authorized, decision 1365 branches to "no" branch 1368 whereupon an error is returned to the requestor (step 1370) and security server processing ends at 1375. On the other hand, if the requestor is authorized, then decision 1365 branches to "yes" branch 1378 whereupon the requested security features are retrieved (step 1380) and the retrieved security features are encrypted and returned to the requestor (step 1385). The encryption of the security feature may include encrypting the features with the security server's private key (i.e., digitally signing the features as being sent by the security server when deciphered using the server's public key) as well as encrypting using the requestor's public key, as only the requestor's private key can be used to decipher the public-key encrypted data. Security server processing then ends at 1399.

Figure 14:
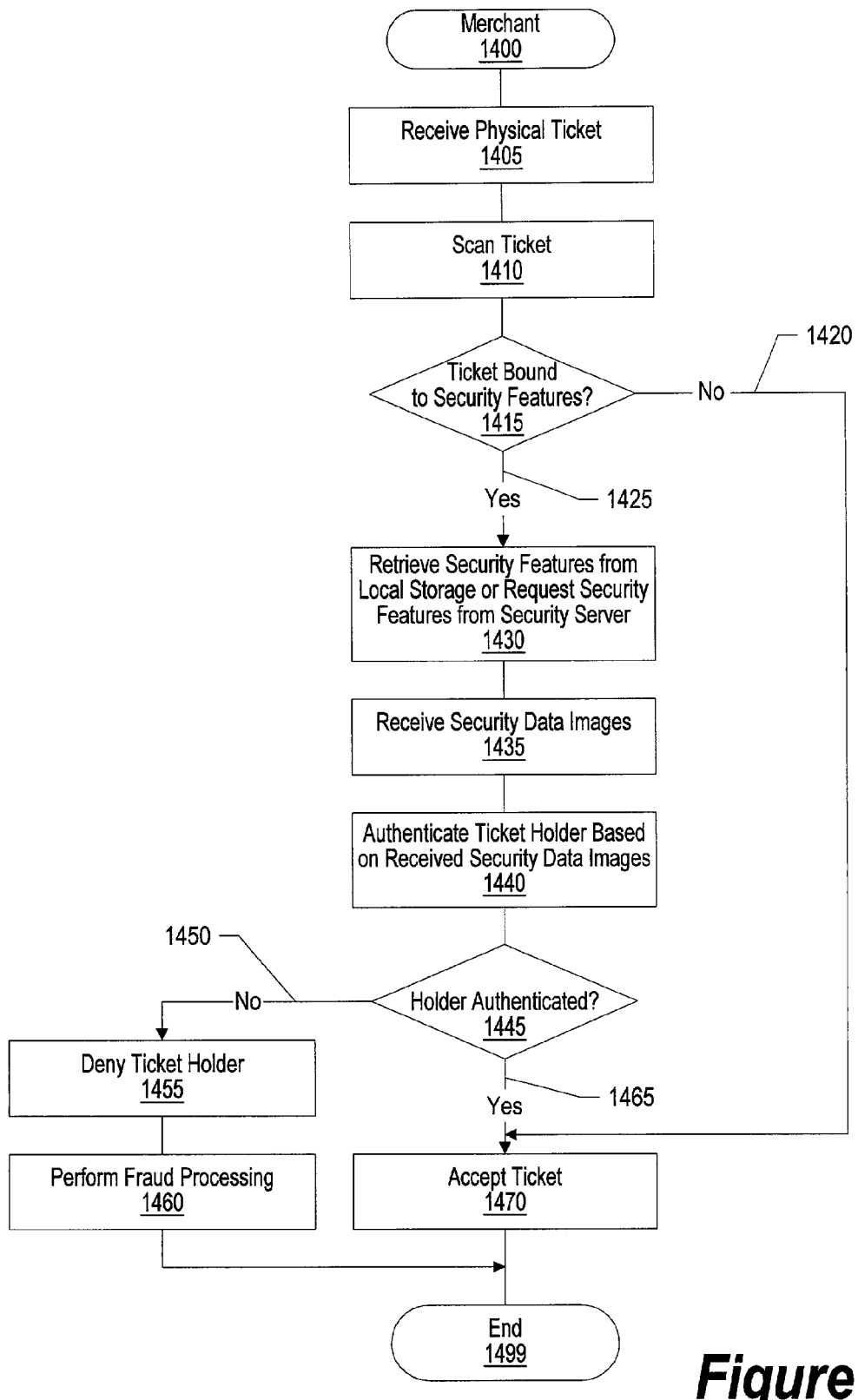
FIG. 14 is a flowchart of a merchant receiving and processing a ticket that includes customer security features.

FIG. 14 is a flowchart of a merchant receiving and processing a ticket that includes customer security features. Processing commences at 1400 whereupon the merchant receives a ticket from a ticket holder (step 1405). The ticket is scanned, for example by scanning a bar code printed on the ticket (step 1410). A determination is made as to whether the ticket is bound to security features based on the scanned ticket identifier (decision 1415). If the ticket is unbound (i.e., not bound to a particular customer's security features), then decision 1415 branches to "no" branch 1420 and the ticket is accepted (step 1470) without further authentication.

On the other hand, if the ticket identifier is bound to a particular customer's security features, decision 1415 branches to "yes" branch 1425 whereupon the customer's security features are retrieved from local merchant storage or using links, as previously described, to retrieve them from a third party security server (step 1430). The customer's security features are received (step 1435) and checked against both the features appearing on the ticket and the personal features found on the ticket holder (step 1440). A determination is made as to whether the ticket holder is authenticated as being the customer that is bound to the ticket (decision 1445). If the holder is not authenticated, decision 1445 branches to "no" branch 1450 whereupon the ticket holder is denied admission (step 1455) and further fraud processing may be performed (step 1460) to determine whether the ticket holder has stolen the ticket and merchant processing ends at 1499. On the other hand, if the ticket and the ticket holder matches the customer's retrieved security features, then decision 1445 branches to "yes" branch 1465 whereupon the ticket is accepted (step 1470) and processing ends at 1499.

Figure 15:
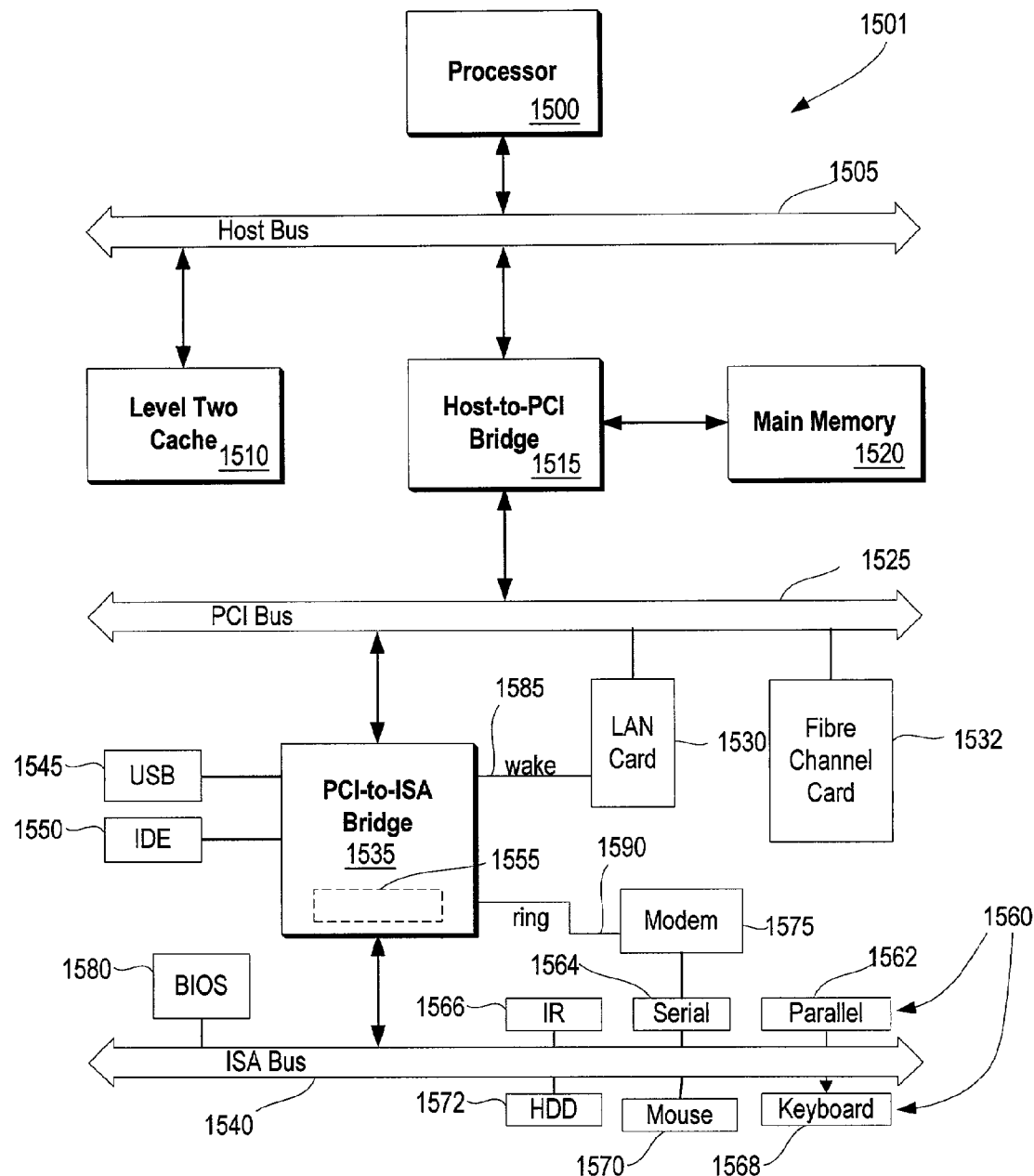
FIG. 15 is a block diagram of an information handling system capable of implementing the present invention.

FIG. 15 illustrates information handling system 1501 which is a simplified example of a computer system capable of performing the present invention. Computer system 1501 includes processor 1500 which is coupled to host bus 1505. A level two (L2) cache memory 1510 is also coupled to the host bus 1505. Host-to-PCI bridge 1515 is coupled to main memory 1520, includes cache memory and main memory control functions, and provides bus control to handle transfers among PCI bus 1525, processor 1500, L2 cache 1510, main memory 1520, and host bus 1505. PCI bus 1525 provides an interface for a variety of devices including, for example, LAN card 1530. PCI-to-ISA bridge 1535 provides bus control to handle transfers between PCI bus 1525 and ISA bus 1540, universal serial bus (USB) functionality 1545, IDE device functionality 1550, power management functionality 1555, and can include other functional elements not shown, such as a real-time clock (RTC), DMA control, interrupt support, and system management bus support. Peripheral devices and input/output (I/O) devices can be attached to various interfaces 1560 (e.g., parallel interface 1562, serial interface 1564, infrared (IR) interface 1566, keyboard interface 1568, mouse interface 1570, and fixed disk (FDD) 1572) coupled to ISA bus 1540. Alternatively, many I/O devices can be accommodated by a super I/O controller (not shown) attached to ISA bus 1540.

BIOS 1580 is coupled to ISA bus 1540, and incorporates the necessary processor executable code for a variety of low-level system functions and system boot functions. BIOS 1580 can be stored in any computer readable medium, including magnetic storage media, optical storage media, flash memory, random access memory, read only memory, and communications media conveying signals encoding the instructions (e.g., signals from a network). In order to attach computer system 1501 another computer system to copy files over a network, LAN card 1530 is coupled to PCI-to-ISA bridge 1535. Similarly, to connect computer system 1501 to an ISP to connect to the Internet using a telephone line connection, modem 1575 is connected to serial port 1564 and PCI-to-ISA Bridge 1535.

While the computer system described in FIG. 15 is capable of executing the invention described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of managing customer security features by a security server, said method comprising:
   receiving a manipulation request from a requestor;
   authenticating the requestor;
   manipulating one or more security features stored in a data area corresponding to a customer in response to the manipulation request;
   receiving an authorization from the customer, the authorization including a first merchant identifier;
   storing the authorization;

receiving a retrieval request from a merchant, the retrieval request including a customer identifier corresponding to the customer and a second merchant identifier corresponding to the merchant;

validating the merchant request, the validating including:
retrieving the authorization; and
comparing the first merchant identifier to the second merchant identifier; and returning one or more security features corresponding to the customer in response to the first merchant identifier matching the second merchant identifier.

2. The method as described in claim 1 wherein at least one of the security features is selected from the group consisting of a photograph of the customer, a customer signature, a digital signature corresponding to the customer, a fingerprint, and a description of the customer.

3. The method as described in claim 1 further comprising:
receiving one or more new security features from the customer;
assigning an item identifier to each of the new security features; and
storing the new security features in the data area corresponding to the customer.

4. The method as described in claim 1 further comprising:
wherein the authorization received from the customer further includes a public key corresponding to the merchant;
wherein storing the authorization further includes storing the public key;
wherein the retrieval request received from the merchant is an encrypted retrieval request, the encrypted retrieval request encrypted using a private key corresponding to the merchant's public key; and
deciphering the encrypted retrieval request using the stored public key.

5. The method as described in claim 1 further comprising:
receiving an edit request from the customer, the edit request including the customer identifier corresponding to the customer and one or more updated security features, the security features each including a security item identifier;
locating a stored security feature corresponding to each of the security item identifiers; and
replacing the stored security features with the updated security features.

6. The method as described in claim 5 further comprising:
verifying the customer, the verifying including:
receiving a secret customer identifier from the customer; and
comparing the secret customer identifier with a stored secret customer identifier corresponding to the customer.

7. The method as described in claim 1 wherein the manipulation request includes an encrypted packet that is encrypted using a private key corresponding to the requestor, the method further comprising:
locating a stored public key corresponding to the requestor; and
deciphering the encrypted packet using the stored public key, the deciphering verifying the identity of the requestor, wherein the manipulating is performed in response to the encrypted packet being successfully deciphered.

8. An information handling system comprising:
one or more processors;
a memory accessible by the processors;
a network interface for communicating with other information handling systems;
one or more nonvolatile storage areas accessible by the processors; and
a security feature management tool to manage customer security features, the security feature management tool including:
means for receiving a manipulation request from a requestor;
means for authenticating the requestor;
means for manipulating one or more security features stored in a data area corresponding to a customer in response to the manipulation request;
means for receiving an authorization from the customer, the authorization including a first merchant identifier;
means for storing the authorization;
means for receiving a retrieval request from a merchant, the retrieval request including a customer identifier corresponding to the customer and a second merchant identifier corresponding to the merchant;
means for validating the merchant request, the means for validating including:
means for retrieving the authorization; and
means for comparing the first merchant identifier to the second merchant identifier; and
means for returning one or more security features corresponding to the customer in response to the first merchant identifier matching the second merchant identifier.

9. The information handling system as described in claim 8 wherein the manipulation request includes an encrypted packet that is encrypted using a private key corresponding to the requestor, the information handling system further comprising:
means for locating a stored public key corresponding to the requestor; and
means for deciphering the encrypted packet using the stored public key, the deciphering verifying the identity of the requestor, wherein the manipulating is performed in response to the encrypted packet being successfully deciphered.

10. The information handling system as described in claim 8 further comprising:
means for receiving one or more new security features from the customer;
means for assigning an item identifier to each of the new security features; and
means for storing the new security features in the data area corresponding to the customer.

11. A computer program product stored on a computer operable medium for managing customer security features by a security server executing said computer program product, said computer program product comprising:
means for receiving a manipulation request from a requestor;
means for authenticating the requestor;
means for manipulating one or more security features stored in a data area corresponding to a customer in response to the manipulation request;
means for receiving an authorization from the customer, the authorization including a first merchant identifier;
means for storing the authorization;
means for receiving a retrieval request from a merchant, the retrieval request including a customer identifier corresponding to the customer and a second merchant identifier corresponding to the merchant;

means for validating the merchant request, the means for validating including:
  means for retrieving the authorization; and
  means for comparing the first merchant identifier to the second merchant identifier; and
means for returning one or more security features corresponding to the customer in response to the first merchant identifier matching the second merchant identifier.

12. The computer program product as described in claim 11 wherein at least one of the security features is selected from the group consisting of a photograph of the customer, a customer signature, a digital signature corresponding to the customer, a fingerprint, and a description of the customer.

13. The computer program product as described in claim 11 further comprising:
  means for receiving one or more new security features from the customer;
  means for assigning an item identifier to each of the new security features; and
  means for storing the new security features in the data area corresponding to the customer.

14. The computer program product as described in claim 11 further comprising:
  wherein the authorization received from the customer includes a public key corresponding to the merchant;
  wherein the means for storing the authorization includes means for storing the merchant's public key;
  wherein the retrieval request received from the merchant is an encrypted retrieval request, the encrypted retrieval request encrypted using a private key corresponding to the merchant's public key; and
  means for deciphering the encrypted retrieval request using the stored public key.

15. The computer program product as described in claim 11 further comprising:
  means for receiving an edit request from the customer, the edit request including the customer identifier corresponding to the customer and one or more updated security features, the security features each including a security item identifier;
  means for locating a stored security feature corresponding to each of the security item identifiers; and
  means for replacing the stored security features with the updated security features.

16. The computer program product as described in claim 15 further comprising:
  means for verifying the customer, the verifying including:
    means for receiving a secret customer identifier from the customer; and
    means for comparing the secret customer identifier with a stored secret customer identifier corresponding to the customer.

17. The computer program product as described in claim 11 wherein the manipulation request includes an encrypted packet that is encrypted using a private key corresponding to the requestor, the computer program product further comprising:
  means for locating a stored public key corresponding to the requestor; and
  means for deciphering the encrypted packet using the stored public key, the deciphering verifying the identity of the requestor, wherein the manipulating is performed in response to the encrypted packet being successfully deciphered.

18. A method of managing customer security features by a security server, said method comprising:
  receiving, by the security server, an edit request from a customer, the edit request including a customer identifier and one or more updated security features, the updated security features each including a security item identifier;
  in response to receiving the edit request, authenticating the customer;
  in response to authenticating the customer, locating a stored security feature corresponding to each of the security item identifiers, wherein the stored security features are stored in a data area accessible by the security server;
  in response to the locating, replacing the stored security features with the updated security features;
  receiving, by the security server, an authorization from the customer, the authorization including a first merchant identifier corresponding to a merchant and a public key corresponding to the merchant;
  storing the authorization and the public key in the data area accessible by the security server;
  receiving, by the security server, an encrypted retrieval request from the merchant, the encrypted retrieval request encrypted using a private key corresponding to the merchant's public key, wherein the encrypted retrieval request includes the customer identifier corresponding to the customer and a second merchant identifier corresponding to the merchant; validating, by the security server, the encrypted retrieval request, the validating including:
    deciphering the encrypted retrieval request using the stored public key;
    retrieving the first merchant identifier within the authorization stored in the data area accessible by the security server; and
    comparing the first merchant identifier to the second merchant identifier; and
  returning, from the security server to the merchant, one or more security features corresponding to the customer in response to the first merchant identifier matching the second merchant identifier.

* * * * *

UNITED STATES PATENT AND TRADEMARK OFFICE
CERTIFICATE OF CORRECTION

PATENT NO. : 6,971,009 B2  Page 1 of 1
DATED : November 29, 2005
INVENTOR(S) : Dutta It is certified that error appears in the above-identified patent and that said Letters Patent is hereby corrected as shown below:

Title page,
Item [56], References Cited, U.S. PATENT DOCUMENTS, insert the following:
-- 6,085,976    07/2000    Sehr    235/384 --.

Column 3,
Line 44, delete "riot" and insert -- not --.

Column 14,
Line 41, delete "to a is" and insert -- to a --.

Signed and Sealed this

Fourth Day of April, 2006

JON W. DUDAS
*Director of the United States Patent and Trademark Office*